US009936497B2

(12) United States Patent
Liu et al.

(10) Patent No.: US 9,936,497 B2
(45) Date of Patent: Apr. 3, 2018

(54) NODE SCHEDULING METHOD AND SYSTEM AND DEVICE

(71) Applicants: Huawei Technologies Co., Ltd., Shenzhen (CN); Beijing University of Posts and Telecommunications, Beijing (CN)

(72) Inventors: Pei Liu, Beijing (CN); Weixia Zou, Beijing (CN); Yibo Wang, Beijing (CN)

(73) Assignees: Huawei Technologies Co., Ltd., Shenzhen (CN); Beijing University of Posts and Telecommunications, Beijing (CN)

( * ) Notice: Subject to any disclaimer, the term of this patent is extended or adjusted under 35 U.S.C. 154(b) by 255 days.

(21) Appl. No.: 14/734,906

(22) Filed: Jun. 9, 2015

(65) Prior Publication Data
US 2015/0282168 A1 Oct. 1, 2015

Related U.S. Application Data

(63) Continuation of application No. PCT/CN2013/089123, filed on Dec. 11, 2013.

(30) Foreign Application Priority Data

Dec. 11, 2012 (CN) .......................... 2012 1 0531572

(51) Int. Cl.
*H04W 4/00* (2018.01)
*H04W 72/04* (2009.01)
(Continued)

(52) U.S. Cl.
CPC ....... *H04W 72/0446* (2013.01); *H04W 48/12* (2013.01); *H04W 72/12* (2013.01); *H04W 28/16* (2013.01); *H04W 72/1278* (2013.01)

(58) Field of Classification Search
CPC .......................... H04W 72/0446; H04W 48/12
See application file for complete search history.

(56) References Cited

U.S. PATENT DOCUMENTS 6,587,453 B1 7/2003 Romans et al.
2008/0267121 A1 10/2008 Lee et al.
(Continued)

FOREIGN PATENT DOCUMENTS

CN 101232419 A 7/2008
CN 101299699 A 11/2008
(Continued)

OTHER PUBLICATIONS

"Information technology—Telecommunications and information exchange between systems local and metropolitan area networks—Specific requirements—Part 15: Wireless medium access control and physical layer (PHY) specification for law rate wireless personal area networks," GB/T 15629.15/2010, pp. i-188, Standardization Administration of China, Beijing, China (Sep. 2, 2010).

*Primary Examiner* — Samina Choudhry
(74) *Attorney, Agent, or Firm* — Leydig, Voit & Mayer, Ltd.

(57) ABSTRACT

Embodiments of the present invention disclose a node scheduling method, where the method includes: configuring, for a node, a working period matched with a performance indicator of the node, where duration of the working period is an integer multiple of duration of a super frame, and the super frame is a super frame corresponding to a beacon frame in a network in which the node is located; and sending, to the node, an updated beacon frame that includes information about the working period, so that the node acquires the information about the working period from the updated beacon frame, receives a working beacon frame, establishes a super frame corresponding to the working beacon frame until the working period ends, and then repeats (Continued)

the receiving a working beacon frame and establishing a super frame corresponding to the working beacon frame until the updated beacon frame is received again.

17 Claims, 12 Drawing Sheets

(51) Int. Cl.
*H04W 72/12* (2009.01)
*H04W 48/12* (2009.01)
*H04W 28/16* (2009.01)

(56) References Cited

U.S. PATENT DOCUMENTS

| | | | |
|---|---|---|---|
| 2009/0103501 A1* | 4/2009 | Farrag | H04W 74/02 370/337 |
| 2009/0238160 A1 | 9/2009 | Bhatti et al. | |
| 2010/0128680 A1 | 5/2010 | Coletti et al. | |
| 2010/0260085 A1 | 10/2010 | Wang et al. | |
| 2011/0029776 A1 | 2/2011 | Xiao et al. | |
| 2011/0038343 A1 | 2/2011 | Bhatti et al. | |
| 2011/0039495 A1* | 2/2011 | Sawai | H04W 52/16 455/62 |
| 2012/0147802 A1* | 6/2012 | Ukita | H04W 52/0277 370/311 |

FOREIGN PATENT DOCUMENTS

| | | | | |
|---|---|---|---|---|
| CN | 101554076 A | 10/2009 | | |
| CN | 101889469 A | 11/2010 | | |
| CN | 101978760 A | 2/2011 | | |
| CN | 103118435 A | 5/2013 | | |
| EP | 0924896 A1 | 6/1999 | | |
| EP | 2227045 A1 | 9/2010 | | |
| WO | 2007004854 A1 | 1/2007 | | |
| WO | WO 2007004854 A1 * | 1/2007 | | H04W 52/0216 |

* cited by examiner

NODE SCHEDULING METHOD AND SYSTEM AND DEVICE

CROSS-REFERENCE TO RELATED APPLICATIONS

This application is a continuation of International Patent Application No. PCT/CN2013/089123, filed on Dec. 11, 2013, which claims priority to Chinese Patent Application No. 201210531572.3, filed on Dec. 11, 2012, both of which are hereby incorporated by reference in their entireties.

TECHNICAL FIELD

The present invention relates to the communications field, and in particular, to a node scheduling method and system and a device.

BACKGROUND

Currently, a coordinator in a personal area network broadcasts a beacon frame in a fixed period, all beacon frames broadcast by the coordinator are received by nodes in the network, and each node enters an active state in an active period of super frames corresponding to all beacon frames, to participate in channel contention and data receiving and sending.

However, in an actual application, node performance indicators of different nodes in the personal area network are different in different time periods. For example, residual energy of node energy is different, requirements for an alarm delay are different, requirements for a frequency of reporting to a coordinator are different, and data receiving and sending throughputs are also different. For example, for a node 1, a frequency of reporting to a coordinator is low, and a data receiving and sending throughput is also low, and for a node 2, a frequency of reporting to a coordinator is high, and a data receiving and sending throughput is also high. Currently, the node 1 and the node 2 in the personal area network receive all beacon frames, establish a corresponding super frame, and enter an active state in an active period of the established super frame, to participate in channel contention and data receiving and sending. In this case, it is possible that the node 1 does not receive and send data in an active period of some super frames, and the node 2 does not meet a data receiving and sending requirement of the node 2 in an active period of some super frames. It can be learned that network resources in a current personal area network cannot be properly utilized.

SUMMARY

Embodiments of the present invention provide a node scheduling method and system and a device, so that network resources in a personal area network can be properly utilized.

A first aspect of the present invention provides a node scheduling method, including:

configuring, for a node, a working period matched with a performance indicator of the node, where duration of the working period is an integer multiple of duration of a super frame, and the super frame is a super frame corresponding to a beacon frame in a network in which the node is located; and sending, to the node, an updated beacon frame that includes information about the working period, so that the node acquires the information about the working period from the updated beacon frame, receives a working beacon frame, establishes a super frame corresponding to the working beacon frame until the working period ends, and then repeats the receiving a working beacon frame and establishing a super frame corresponding to the working beacon frame until the updated beacon frame is received again, where the working beacon frame is a beacon frame broadcast in the network at a start moment of the working period.

In a first possible implementation manner of the first aspect, the performance indicator includes at least one of the following:

residual energy of node energy, a data receiving and sending throughput, a data reporting frequency, and an alarm delay.

With reference to the first aspect, in a second possible implementation manner, the configuring, for a node, a working period matched with a performance indicator of the node includes:

separately configuring, for each node in the network, a working period matched with a performance indicator of the node; and the sending, to the node, an updated beacon frame that includes information about the working period includes:

sending, to each node, an updated beacon frame that includes information about the working period, so that each node acquires, from the updated beacon frame, the information about the working period of the node, and the node receives a working beacon frame, establishes a super frame corresponding to the working beacon frame until the working period ends, and then repeats the receiving a working beacon frame and establishing a super frame corresponding to the working beacon frame until the updated beacon frame is received again, where the working beacon frame is a beacon frame broadcast in the network at a start moment of the working period.

With reference to the second possible implementation manner of the first aspect, in a third possible implementation manner, the updated beacon frame includes:

a super-frame specification field and a beacon payload field; where the $13^{th}$ bit of the super-frame specification field is set to 1, the beacon payload field includes a period allocation field, the period allocation field includes an updated quantity of nodes, a beacon order, and a period allocation list, the beacon order is used to indicate duration of a super frame corresponding to the updated beacon frame, the period allocation list includes at least one period allocation descriptor, and the period allocation descriptor includes an address of a node and information about times of the duration of the super frame;

the updated quantity of nodes is a quantity of all nodes in the network; and the period allocation list includes a period allocation descriptor, where a quantity of the period allocation descriptor is the quantity of all nodes in the network, one period allocation descriptor corresponds to one node, and duration of the working period of each node is equal to the duration of the super frame multiplied by the times, where the times are included in the period allocation descriptor corresponding to the node.

With reference to the first aspect, in a fourth possible implementation manner, the configuring, for a node, a working period matched with a performance indicator of the node includes:

configuring, for a newly added node, a working period matched with a performance indicator of the newly added node; and the sending, to the node, an updated beacon frame that includes information about the working period includes:

sending, to the newly added node, an updated beacon frame that includes information about the working period, so that the newly added node acquires the information about the working period from the updated beacon frame, receives a working beacon frame, establishes a super frame corresponding to the working beacon frame until the working period ends, and then repeats the receiving a working beacon frame and establishing a super frame corresponding to the working beacon frame until the updated beacon frame is received again, where the working beacon frame is a beacon frame broadcast in the network at a start moment of the working period.

With reference to the fourth possible implementation manner of the first aspect, in a fifth possible implementation manner, the updated beacon frame includes:

a super-frame specification field and a beacon payload field; where the $13^{th}$ bit of the super-frame specification field is set to 1, the beacon payload field includes a period allocation field, the period allocation field includes an updated quantity of nodes, a beacon order, and a period allocation list, the beacon order is used to indicate duration of a super frame corresponding to the updated beacon frame, the period allocation list includes at least one period allocation descriptor, and the period allocation descriptor includes an address of a node and information that corresponds to the address of the node and is about times of the duration of the super frame;

the updated quantity of nodes is a quantity of the newly added node; and the period allocation list includes a period allocation descriptor, where a quantity of the period allocation descriptor is the quantity of the newly added node, one period allocation descriptor corresponds to one newly added node, and duration of the working period of the newly added node is equal to the duration of the super frame multiplied by the times, where the times are included in the period allocation descriptor.

With reference to the first aspect, in a sixth possible implementation manner, before the configuring, for a node, a working period matched with a performance indicator of the node, the method further includes:

receiving a current performance indicator reported by each node in the network, separately determining whether a change occurs between the received current performance indicator of each node and a performance indicator that is acquired in advance and is of the node, and if a change occurs between the received current performance indicator of each node and the performance indicator that is acquired in advance and is of the node, triggering the step of configuring, for a node, a working period matched with a performance indicator of the node;

the configuring, for a node, a working period matched with a performance indicator of the node includes:

configuring, for a node on which it is determined that a change occurs, a working period matched with the current performance indicator of the node on which it is determined that a change occurs; and the sending, to the node, an updated beacon frame that includes information about the working period includes:

sending, to the node on which it is determined that a change occurs, an updated beacon frame that includes information about the working period.

A second aspect of the present invention provides another node scheduling method, including:

receiving an updated beacon frame that includes information about a working period and is sent by a coordinator, where the working period is matched with a performance indicator of a device that implements the method, duration of the working period is an integer multiple of duration of a super frame, and the super frame is a super frame corresponding to a beacon frame in a network in which the device is located;

acquiring the information about the working period from the updated beacon frame;

receiving a working beacon frame, where the working beacon frame is a beacon frame sent by the coordinator at a start moment of the working period;

establishing a super frame corresponding to the working beacon frame; and when the working period ends, repeating the step of receiving a working beacon frame until the updated beacon frame is received again.

In a first possible implementation manner of the second aspect, the performance indicator includes at least one of the following:

residual energy of node energy, a data receiving and sending throughput, a data reporting frequency, and an alarm delay.

With reference to the second aspect or the first possible implementation manner of the second aspect, in a second possible implementation manner, after the acquiring the information about the working period from the updated beacon frame, and before the receiving a working beacon frame, the method further includes:

establishing a super frame corresponding to the updated beacon frame; and the receiving a working beacon frame includes:

after the super frame ends, receiving the working beacon frame at the start moment of the working period.

With reference to the second aspect or the first possible implementation manner of the second aspect, in a third possible implementation manner, the updated beacon frame includes:

a super-frame specification field and a beacon payload field; where the $13^{th}$ bit of the super-frame specification field is set to 1, the beacon payload field includes a period allocation field, the period allocation field includes an updated quantity of devices, a beacon order, and a period allocation list, the beacon order is used to indicate duration of a super frame corresponding to the updated beacon frame, the period allocation list includes at least one period allocation descriptor, and the period allocation descriptor includes an address of a device and information about times of the duration of the super frame; and one period allocation descriptor corresponds to one device, and duration that corresponds to each device and is of a working period is equal to the duration of the super frame multiplied by the times, where the times are included in the period allocation descriptor corresponding to the device.

With reference to the second aspect or the first possible implementation manner of the second aspect, in a fourth possible implementation manner, before the receiving an updated beacon frame that includes information about a working period and is sent by a coordinator, the method further includes:

sending a current performance indicator to the coordinator, so that the coordinator determines whether a change occurs between the current performance indicator and the performance indicator that is acquired by the coordinator in advance and is of the device that implements the method, and if a change occurs between the current performance indicator and the performance indicator that is acquired by the coordinator in advance and is of the device that implements the method, the coordinator configures, for the device that implements the method, a working period matched with the current performance indicator; and the receiving an updated beacon frame that includes information about a working period and is sent by a coordinator includes:

receiving the updated beacon frame that includes the information about the working period and is sent by the coordinator, where the working period is matched with the current performance indicator.

A third aspect of the present invention provides a network device, including a first configuring unit and a sending unit; where the first configuring unit is configured to configure, for a node, a working period matched with a performance indicator of the node, where duration of the working period is an integer multiple of duration of a super frame, and the super frame is a super frame corresponding to a beacon frame in a network in which the node is located; and the sending unit is configured to send, to the node, an updated beacon frame that includes information about the working period, so that the node acquires the information about the working period from the updated beacon frame, receives a working beacon frame, establishes a super frame corresponding to the working beacon frame until the working period ends, and then repeats the receiving a working beacon frame and establishing a super frame corresponding to the working beacon frame until the updated beacon frame is received again, where the working beacon frame is a beacon frame broadcast in the network at a start moment of the working period.

In a first possible implementation manner of the third aspect, the first configuring unit is further configured to separately configure, for each node in the network, a working period matched with a performance indicator of the node; and the sending unit is further configured to send, to each node, an updated beacon frame that includes information about the working period, so that each node acquires, from the updated beacon frame, the information about the working period of the node, and the node receives a working beacon frame, establishes a super frame corresponding to the working beacon frame until the working period ends, and then repeats the receiving a working beacon frame and establishing a super frame corresponding to the working beacon frame until the updated beacon frame is received again, where the working beacon frame is a beacon frame broadcast in the network at a start moment of the working period.

With reference to the first possible implementation manner of the third aspect, in a second possible implementation manner, the updated beacon frame includes:

a super-frame specification field and a beacon payload field; where the 13$^{th}$ bit of the super-frame specification field is set to 1, the beacon payload field includes a period allocation field, the period allocation field includes an updated quantity of nodes, a beacon order, and a period allocation list, the beacon order is used to indicate duration of a super frame corresponding to the updated beacon frame, the period allocation list includes at least one period allocation descriptor, and the period allocation descriptor includes an address of a node and information about times of the duration of the super frame;

the updated quantity of nodes is a quantity of all nodes in the network; and the period allocation list includes a period allocation descriptor, where a quantity of the period allocation descriptor is the quantity of all nodes in the network, one period allocation descriptor corresponds to one node, and duration of the working period of each node is equal to the duration of the super frame multiplied by the times, where the times are included in the period allocation descriptor corresponding to the node.

With reference to the third aspect, in a third possible implementation manner, the first configuring unit is further configured to configure, for a newly added node, a working period matched with a performance indicator of the newly added node; and the sending unit is further configured to send, to the newly added node, an updated beacon frame that includes information about the working period, so that the newly added node acquires the information about the working period from the updated beacon frame, receives a working beacon frame, establishes a super frame corresponding to the working beacon frame until the working period ends, and then repeats the receiving a working beacon frame and establishing a super frame corresponding to the working beacon frame until the updated beacon frame is received again, where the working beacon frame is a beacon frame broadcast in the network at a start moment of the working period.

With reference to the third possible implementation manner of the third aspect, in a fourth possible implementation manner, the updated beacon frame includes:

a super-frame specification field and a beacon payload field; where the 13$^{th}$ bit of the super-frame specification field is set to 1, the beacon payload field includes a period allocation field, the period allocation field includes an updated quantity of nodes, a beacon order, and a period allocation list, the beacon order is used to indicate duration of a super frame corresponding to the updated beacon frame, the period allocation list includes at least one period allocation descriptor, and the period allocation descriptor includes an address of a node and information that corresponds to the address of the node and is about times of the duration of the super frame;

the updated quantity of nodes is a quantity of the newly added node; and the period allocation list includes a period allocation descriptor, where a quantity of the period allocation descriptor is the quantity of the newly added node, one period allocation descriptor corresponds to one newly added node, and duration of the working period of the newly added node is equal to the duration of the super frame multiplied by the times, where the times are included in the period allocation descriptor.

With reference to any one of the foregoing implementation manners of the third aspect, in a fifth possible implementation manner, the network device further includes:

a determining unit, configured to: receive a current performance indicator reported by each node in the network, and separately determine whether a change occurs between the received current performance indicator of each node and a performance indicator that is acquired in advance and is of the node; and the first configuring unit is further configured to: when a result of determining by the determining unit is yes, configure, for a node on which it is determined that a change occurs, a working period matched with the current performance indicator of the node on which it is determined that a change occurs; and the sending unit is further configured to send, to the node on which it is determined that a change occurs, an updated beacon frame that includes information about the working period.

With reference to any one of the foregoing implementation manners of the third aspect, in a sixth possible implementation manner, the network device further includes:

a calculating unit, configured to: when a current beacon frame needs to be broadcast, obtain, by calculation according to a working period allocated to each node in the network, at least one node that can receive the current beacon frame, and use the at least one node as a group; and a second configuring unit, configured to configure, according to a GTS request sent in a previous super frame that is established, on each node, by the node in the group, a GTS field included in the current beacon frame, where the GTS field is used to identify a node that is assigned to the group in a contention free period of a super frame corresponding to the current beacon frame, and the previous super frame established by the node is a previous super frame of the super frame that corresponds to the current beacon frame and is established by the node; and the sending unit is further configured to send the current beacon frame to the node in the group.

A fourth aspect of the present invention provides a node device, including a receiving unit, an acquiring unit, a receiving unit, and a first establishing unit; where the receiving unit is configured to receive an updated beacon frame that includes information about a working period and is sent by a coordinator, where the working period is matched with a performance indicator of the node device, duration of the working period is an integer multiple of duration of a super frame, and the super frame is a super frame corresponding to a beacon frame in a network in which the node device is located;

the acquiring unit is configured to acquire the information about the working period from the updated beacon frame;

the receiving unit is configured to receive a working beacon frame, where the working beacon frame is a beacon frame sent by the coordinator at a start moment of the working period;

the first establishing unit is configured to establish a super frame corresponding to the working beacon frame; and the receiving unit is further configured to: when the working period ends, repeat the receiving a working beacon frame until the updated beacon frame is received again.

In a first possible implementation manner of the fourth aspect, the node device further includes:

a second establishing unit, configured to establish a super frame corresponding to the updated beacon frame; and the receiving unit is further configured to: after the super frame ends, receive the working beacon frame at the start moment of the working period.

With reference to the fourth aspect or the first possible implementation manner of the fifth aspect, in a second possible implementation manner, the updated beacon frame includes:

a super-frame specification field and a beacon payload field; where the $13^{th}$ bit of the super-frame specification field is set to 1, the beacon payload field includes a period allocation field, the period allocation field includes an updated quantity of node devices, a beacon order, and a period allocation list, the beacon order is used to indicate duration of a super frame corresponding to the updated beacon frame, the period allocation list includes at least one period allocation descriptor, and the period allocation descriptor includes an address of a node device and information about times of the duration of the super frame; and one period allocation descriptor corresponds to one node device, and duration that corresponds to each node device and is of a working period is equal to the duration of the super frame multiplied by the times, where the times are included in the period allocation descriptor corresponding to the node device.

With reference to the second possible implementation manner of the fifth aspect, in a third possible implementation manner, the acquiring unit includes:

a calculating unit, configured to: acquire the beacon order from the updated beacon frame, and obtain, by calculation, the duration of the super frame corresponding to the updated beacon frame; and an acquiring subunit, configured to: acquire, from the period allocation list, an allocation descriptor that includes the address of the node device, acquire the information about the times of the duration of the super frame from the acquired allocation descriptor, and use the duration of the super frame multiplied by the times as the duration of the working period.

With reference to the fifth aspect or the first possible implementation manner of the fifth aspect, in a fourth possible implementation manner, the node device further includes:

a sending unit, configured to send a current performance indicator to the coordinator, so that the coordinator determines whether a change occurs between the current performance indicator and the performance indicator that is acquired by the coordinator in advance and is of the node device, and if a change occurs between the current performance indicator and the performance indicator that is acquired by the coordinator in advance and is of the node device, the coordinator configures, for the node device, a working period matched with the current performance indicator; and the receiving unit is further configured to receive the updated beacon frame that includes the information about the working period and is sent by the coordinator, where the working period is matched with the current performance indicator.

A fifth aspect of the present invention provides a node scheduling system, including the foregoing network device and the foregoing node device.

In the foregoing technical solution, a working period matched with a performance indicator of a node is configured for the node, and an updated beacon frame that includes information about the working period is sent to the node, so that the node acquires the information about the working period from the updated beacon frame, receives a working beacon frame, establishes a super frame corresponding to the working beacon frame until the working period ends, and then repeats the receiving a working beacon frame and establishing a super frame corresponding to the working beacon frame until the updated beacon frame is received again. A working period matched with a performance indicator of a node is configured for the node, the node receives a working beacon frame in the working period, and the working beacon frame is a beacon frame sent by a coordinator at a start moment of the working period; in this way, it can be implemented that only one beacon frame is received within one working period. Compared with the prior art in which all node devices receive all beacon frames, the present invention can make network resources in a personal area network be properly utilized.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
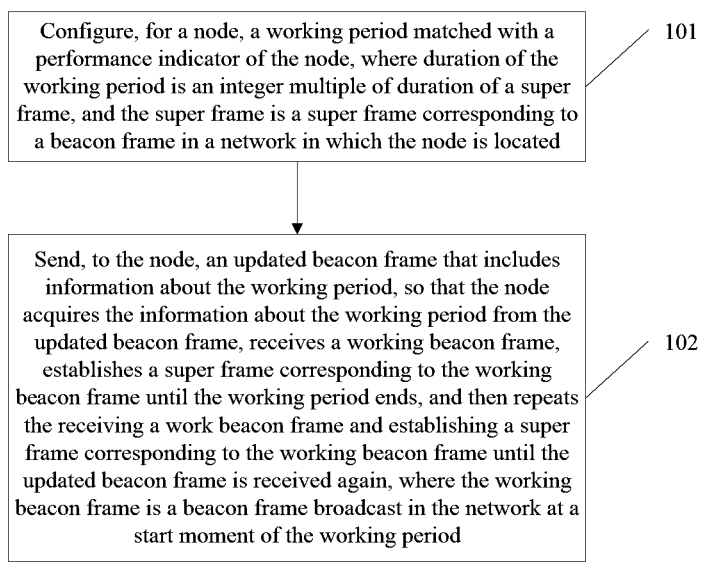
FIG. 1 is a schematic flowchart of a node scheduling method according to an embodiment of the present invention.

FIG. 1 is a schematic flowchart of a node scheduling method according to an embodiment of the present invention. As shown in FIG. 1, the method includes:

101. Configure, for a node, a working period matched with a performance indicator of the node, where duration of the working period is an integer multiple of duration of a super frame, and the super frame is a super frame corresponding to a beacon frame in a network in which the node is located.

Optionally, the foregoing working period matched with the performance indicator of the node may refer to a working period in which network resources are reduced as much as possible on a premise that a requirement of the performance indicator of the node is met. For example, a higher requirement of the performance indicator indicates longer duration of the working period matched with the performance indicator, and a lower requirement of the performance indicator indicates shorter duration of the working period matched with the performance indicator. For example, a requirement of a performance indicator of the foregoing node is that a data throughput is low, and a data reporting frequency is low, in this case, a working period with relatively long duration may be configured for the node.

In an optional implementation manner, the foregoing performance indicator may include at least one of the following:

residual energy of node energy, a data receiving and sending throughput, a data reporting frequency, and an alarm delay.

Optionally, lower residual energy of node energy indicates longer duration of the working period configured in step 101; on the contrary, higher residual energy of node energy indicates shorter duration of the working period configured in step 101.

Optionally, a lower data receiving and sending throughput of a node device indicates longer duration of the working period configured in step 101; on the contrary, a higher data receiving and sending throughput of the node device indicates shorter duration of the working period configured in step 101.

Optionally, a lower data reporting frequency of a node device indicates longer duration of the working period configured in step 101; on the contrary, a higher data reporting frequency of the node device indicates shorter duration of the working period configured in step 101.

Optionally, a longer alarm delay of a node device indicates longer duration of the working period configured in step 101; on the contrary, a shorter alarm delay of the node device indicates shorter duration of the working period configured in step 101.

102. Send, to the node, an updated beacon frame that includes information about the working period, so that the node acquires the information about the working period from the updated beacon frame, receives a working beacon frame, establishes a super frame corresponding to the working beacon frame until the working period ends, and then repeats the receiving a working beacon frame and establishing a super frame corresponding to the working beacon frame until the updated beacon frame is received again, where the working beacon frame is a beacon frame broadcast in the network at a start moment of the working period.

Optionally, when receiving the foregoing updated beacon frame, the foregoing node may acquire the information about the working period from the updated beacon frame, receive a working beacon frame, establish a super frame corresponding to the working beacon frame until the working period ends, and then repeat the receiving a working beacon frame and establishing a super frame corresponding to the working beacon frame until the updated beacon frame is received again.

Optionally, the foregoing working period may further include:

a listening period and a sleep period, where the listening period is an earlier part of the working period, duration of the listening period is equal to duration of an active period of the super frame corresponding to the foregoing working beacon frame, and the rest part of the working period is the sleep period. That is, the node establishes a super frame in the listening period of the working period, and is in an active state in the active period of the super frame, and when an inactive period of the super frame starts, the node enters the sleep period and is in a sleep state.

In a possible implementation manner, before step 101, the method may further include:

receiving a current performance indicator reported by each node in the network, separately determining whether a change occurs between the received current performance indicator of each node and a performance indicator that is acquired in advance and is of the node, and if a change occurs between the received current performance indicator of each node and a performance indicator that is acquired in advance and is of the node, triggering step 101.

Optionally, in this implementation manner, step 101 may include:

configuring, for a node on which it is determined that a change occurs, a working period matched with the current performance indicator of the node on which it is determined that a change occurs.

Optionally, in this implementation manner, step 102 may include:

sending, to the node on which it is determined that a change occurs, an updated beacon frame that includes information about the working period.

In an optional implementation manner, a device for implementing the method may be a coordinator in a personal area network, in a wireless monitoring system based on a wireless sensor network, or in a wireless smart household system based on a wireless sensor network.

In the foregoing technical solution, a working period matched with a performance indicator of a node is configured for the node, and an updated beacon frame that includes information about the working period is sent to the node, so that the node acquires the information about the working period from the updated beacon frame, receives a working beacon frame, establishes a super frame corresponding to the working beacon frame until the working period ends, and then repeats the receiving a working beacon frame and establishing a super frame corresponding to the working beacon frame until the updated beacon frame is received again. A working period matched with a performance indicator of a node is configured for the node, the node receives a working beacon frame in the working period, and the working beacon frame is a beacon frame sent by a coordinator at a start moment of the working period; in this way, it can be implemented that only one beacon frame is received within one working period. Compared with the prior art in which all node devices receive all beacon frames, the present invention can make network resources in a personal area network be properly utilized.

Figure 2:
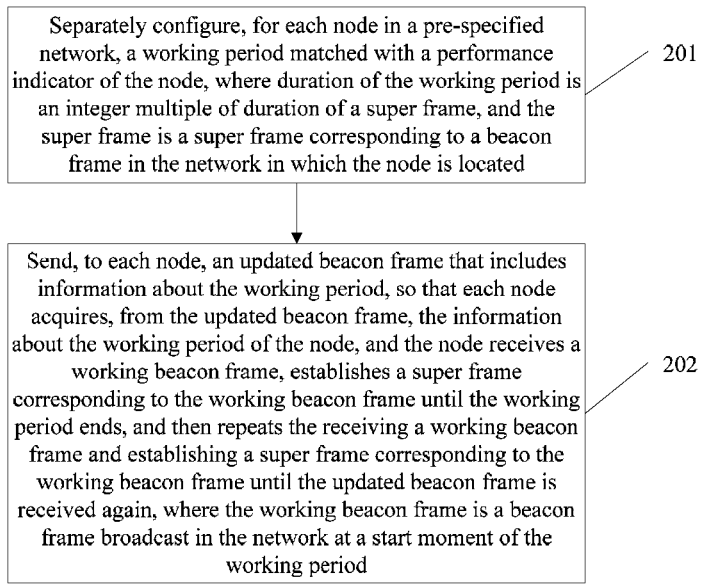
FIG. 2 is a schematic flowchart of another node scheduling method according to an embodiment of the present invention.

FIG. 2 is a schematic flowchart of another node scheduling method according to an embodiment of the present invention. As shown in FIG. 2, the method includes:

201. Separately configure, for each node in a pre-specified network, a working period matched with a performance indicator of the node, where duration of the working period is an integer multiple of duration of a super frame, and the super frame is a super frame corresponding to a beacon frame in the network in which the node is located.

Optionally, the foregoing pre-specified network may be a personal area network, a wireless monitoring system based on a wireless sensor network, or a wireless smart household system based on a wireless sensor network.

Optionally, duration of super frames corresponding to all beacon frames in the foregoing network may be the same, that is, duration of super frames established by nodes is the same.

Figure 3:
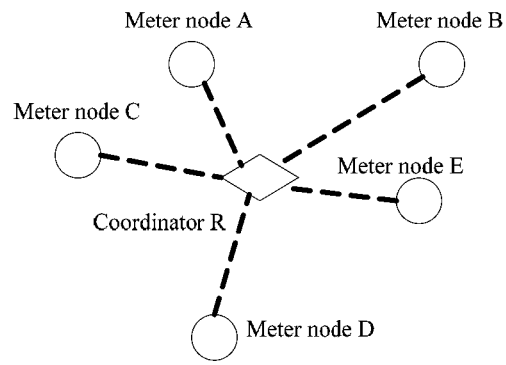
FIG. 3 is an optional scene graph according to an embodiment of the present invention.

In an optional implementation manner, an application scenario of this embodiment may be shown in FIG. 3. The foregoing network includes a meter node A, a meter node B, a meter node C, a meter node D, and a meter node E. A device for implementing the present invention may be a coordinator R. That is, in step 201, a working period matched with a performance indicator of each node is separately configured for the foregoing meter node A, meter node B, meter node C, meter node D, and meter node E. That is, a same or different working period may be configured for each node.

202. Send, to each node, an updated beacon frame that includes information about the working period, so that each node acquires, from the updated beacon frame, the information about the working period of the node, and the node receives a working beacon frame, establishes a super frame corresponding to the working beacon frame until the working period ends, and then repeats the receiving a working beacon frame and establishing a super frame corresponding to the working beacon frame until the updated beacon frame is received again, where the working beacon frame is a beacon frame broadcast in the network at a start moment of the working period.

In an optional implementation manner, the foregoing updated beacon frame may be a start beacon frame in the foregoing network, that is, the first beacon frame sent to the foregoing node in the foregoing network. Certainly, the foregoing updated beacon frame may also be another beacon frame, for example, a beacon frame, where a difference of a specific period exists between sending time of the beacon frame and that of the first beacon frame. That is, the foregoing steps 201 and 202 are periodically performed. In this way, it can be implemented that a working period of a node is periodically updated.

In an optional implementation manner, the updated beacon frame includes:

a super-frame specification field and a beacon payload field; where the $13^{th}$ bit of the super-frame specification field is set to 1, the beacon payload field includes a period allocation field, the period allocation field includes an updated quantity of nodes, a beacon order, and a period allocation list, the beacon order is used to indicate duration of a super frame corresponding to the updated beacon frame, the period allocation list includes at least one period allocation descriptor, and the period allocation descriptor includes an address of a node and information about times of the duration of the super frame;

the updated quantity of nodes is a quantity of all nodes in the network; and the period allocation list includes a period allocation descriptor, where a quantity of the period allocation descriptor is the quantity of all nodes in the network, one period allocation descriptor corresponds to one node, and duration of the working period of each node is equal to the duration of the super frame multiplied by the times, where the times are included in the period allocation descriptor corresponding to the node.

Optionally, the foregoing super-frame specification field may be shown in the following table:

| Bits: 0-3 | 4-7 | 8-11 | 12 | 13 | 14 | 15 |
|---|---|---|---|---|---|---|
| Beacon sequence | Super frame sequence | Last timeslot of a CAP | Battery life extension (BLE) | Listening and sleep period allocation | PAN coordinator | Association permit |

Optionally, in this embodiment, a beacon frame broadcast in a network (such as a beacon frame sent by a coordinator) is sent to all nodes; however, each node receives only a beacon frame that is broadcast in the network at a start moment of a working period of the node. When a beacon frame includes information about the foregoing working period, the beacon frame is defined as an updated beacon frame, and the 13$^{th}$ bit of a super-frame specification field in the beacon frame is set to 1, and if the beacon frame is not an updated beacon frame, the 13$^{th}$ bit of the super-frame specification field in the beacon frame is set to 0. When learning that the 13$^{th}$ bit of a super-frame specification field in a beacon frame is set to 0, a node acquires a beacon payload field in the beacon frame, and acquires a period allocation field included in the beacon payload field.

Optionally, the foregoing period allocation field may be shown in the following table:

| Quantity of bits: 8 | Quantity of bits: 8 | Variable |
|---|---|---|
| Updated quantity of nodes | Beacon order (BO) | Period allocation list |

Optionally, the foregoing period allocation descriptor may be shown in the following table:

| Bits: 0-15 | 16-23 |
|---|---|
| Short address of a device | Times relationship between duration of a working period and duration of a super frame |

Optionally, when the foregoing quantity of nodes in the network is 10, the foregoing updated quantity of nodes is 10, and the foregoing period allocation list may include 10 period allocation descriptors, where each period allocation descriptor includes an address of one node and information that corresponds to the address of the node and is about times of the duration of the super frame. The foregoing information about the times of the duration of the super frame may be specifically one numeral, such as 5 times or 10 times. For example, information that corresponds to a node 1 and is about times of the duration of the super frame is 5 times, and the duration of the super frame is 10 ms, then duration of a working period of the node 1 is 50 ms.

In a possible implementation manner, after step 202, the method may further include:

receiving a current performance indicator reported by each node in the network, separately determining whether a change occurs between the received current performance indicator of each node and a performance indicator that is acquired in advance and is of the node, and if a change occurs between the received current performance indicator of each node and the performance indicator that is acquired in advance and is of the node, configuring, for a node on which it is determined that a change occurs, a working period matched with the current performance indicator of the node on which it is determined that a change occurs; and sending, to the node on which it is determined that a change occurs, an updated beacon frame that includes information about the working period.

In this implementation manner, it can be implemented that, a current performance indicator sent by each node is received after a working period is configured for each node in the foregoing network. When it is determined that performance indicators of some nodes change, working periods matched with current performance indicators are configured again for these nodes, so as to implement timely update of the working periods of the nodes and maximize utilization of network resources.

Optionally, in this implementation manner, for the updated beacon frame, refer to the beacon frame in the foregoing implementation manners. That is, the updated beacon frame includes a super-frame specification field and a beacon payload field. The foregoing updated quantity of nodes is a quantity of the node on which it is determined that a change occurs, and each period allocation descriptor in the period allocation list corresponds to one node on which it is determined that a change occurs.

Figure 4:
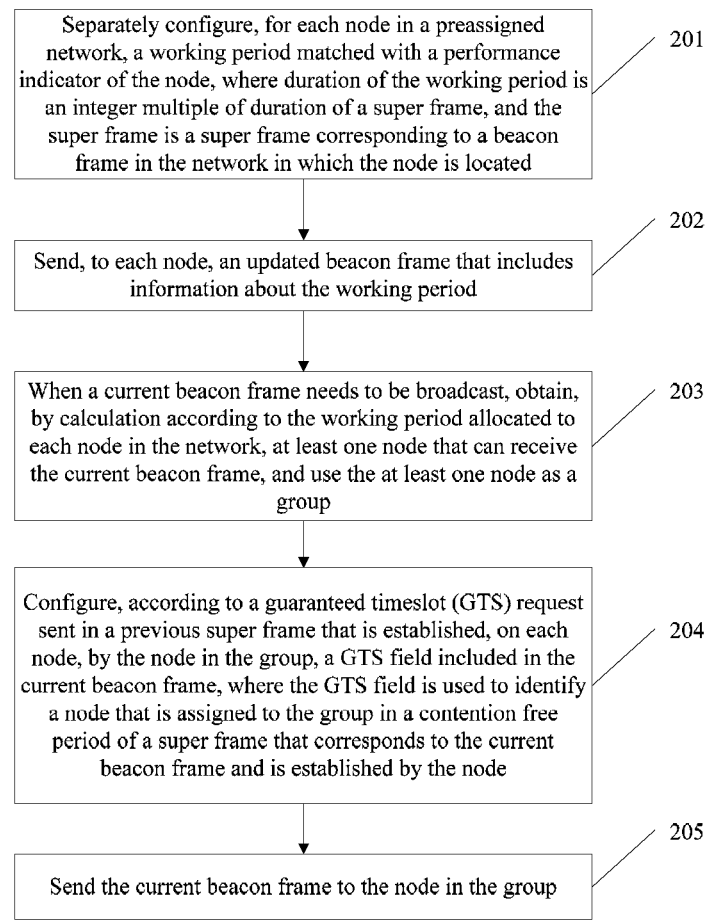
FIG. 4 is a schematic flowchart of another node scheduling method according to an embodiment of the present invention.

In an optional implementation manner, as shown in FIG. 4, after step 202, the method may further include:

203. When a current beacon frame needs to be broadcast, obtain, by calculation according to a working period allocated to each node in the network, at least one node that can receive the current beacon frame, and use the at least one node as a group.

204. Configure, according to a guaranteed timeslot (GTS) request sent in a previous super frame that is established, on each node, by the node in the group, a GTS field included in the current beacon frame, where the GTS field is used to identify a node that is assigned to the group in a contention free period of a super frame corresponding to the current beacon frame, and the previous super frame established by the node is a previous super frame of the super frame that corresponds to the current beacon frame and is established by the node.

205. Send the current beacon frame to the node in the group.

It should be noted that in the present invention, a beacon frame (such as an updated beacon frame, a working beacon frame, and a current beacon frame) may be sent to all nodes in the network. However, working periods of different nodes are different; therefore, different beacon frames are received by different nodes. For example, the foregoing current beacon frame is received by the node in the foregoing group.

Optionally, in this implementation manner, the current beacon frame may be any beacon frame after the foregoing updated beacon frame.

Figure 5:
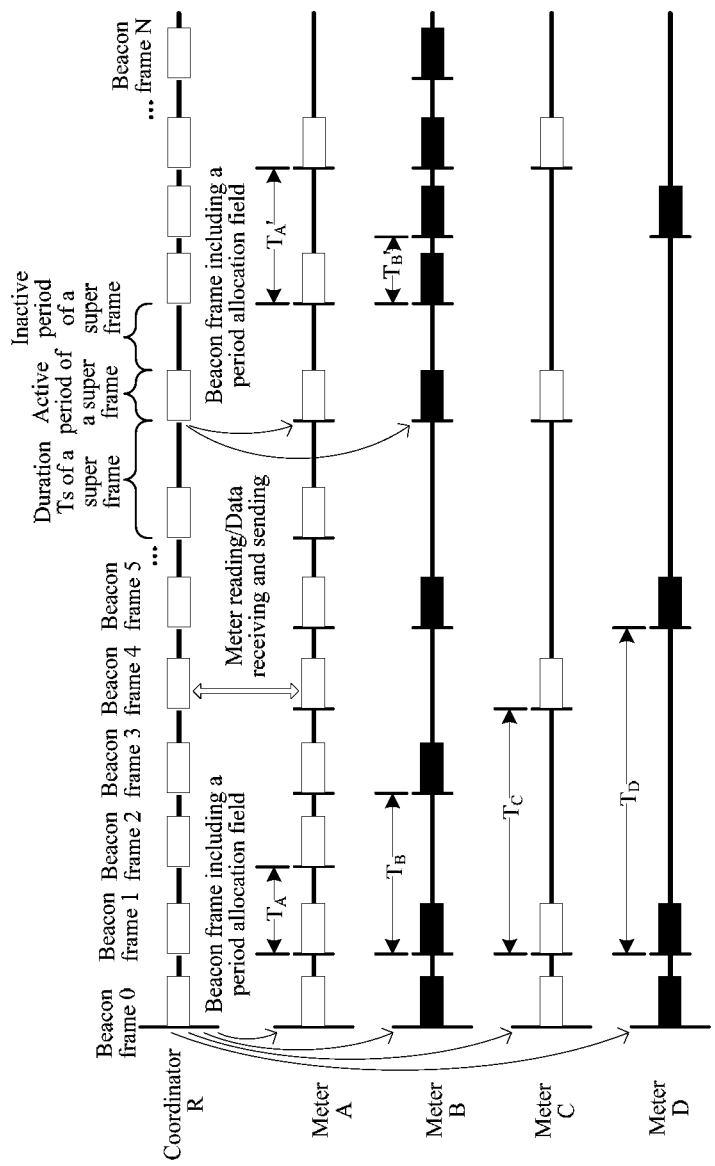
FIG. 5 is an optional node working schematic diagram according to an embodiment of the present invention.

For example, the foregoing group includes a node A and a node B, that is, only the node A and the node B can receive the foregoing current beacon frame. In this case, in step 204, a GTS field included in the current beacon frame can be configured according to a GTS request that corresponds to the node A and the node B and is sent in a previous super frame. For example, as shown in FIG. 5, the foregoing current beacon frame is the $3^{rd}$ beacon frame, in this case, the node A and the node B receive the beacon frame respectively in the third working period and the second working period, and before the node A and the node B receive the beacon frame, a super frame established by the node A and the node B (that is, the previous super frame, which is established by the node, in step 204) is a super frame corresponding to the $1^{st}$ beacon frame, that is, the third super frame and the second super frame respectively established by the node A and the node B. In this case, in step 204, a GTS field included in the $3^{rd}$ beacon frame is configured according to a GTS request sent in the third super frame and the second super frame that are respectively established by the node A and the node B, that is, a contention free period of a super frame corresponding to the $3^{rd}$ beacon frame is assigned to the node A and the node B.

It should be noted that the foregoing technology for receiving a GTS request and allocating a contention free period is the prior art, and details are not described herein.

Optionally, the foregoing network includes a node A, a node B, a node C, and a node D, where duration of working periods allocated to the node A, the node B, the node C, and the node D is respectively $T_A$, $T_B$, $T_C$, and $T_D$, and a beacon frame (such as the $0^{th}$ beacon frame shown in FIG. 5) is updated so that information that is about duration of a super frame and is updated to duration $T_S$ of a super frame in the network; then, super frames established by the node A, the node B, the node C, and the node D may be shown in FIG. 5, where the first line is beacon frames broadcast by a coordinator, solid blocks in the second, the third, the fourth, and the fifth lines are active periods of super frames established by each node, and a straight-line part indicates an inactive period of a super frame and a period in which receiving of a beacon frame stops. For example, duration of a working period configured for the node A is the same as the duration of the super frame, in this case, the node A receives all beacon frames sent by the coordinator and establishes super frames. For example, duration of a working period configured for the node B is 2 times the duration of the super frame, in this case, the node B receives a beacon frame sent by the coordinator at a start moment of the working period of the node B and establishes the super frame.

Optionally, a meaning of a character "a beacon frame including a period allocation field", which is shown on the right side of FIG. 5, in the first line and the second line refers to that the beacon frame is a new and updated beacon frame, as described in the foregoing step of sending, to the node on which it is determined that a change occurs, an updated beacon frame that includes information about the working period. The foregoing nodes on which it is determined that a change occurs include the node A and the node B. After the node A and the node B receive the updated beacon frame, working periods are adjusted; for example, working periods of the node A and the node B are respectively $T_A'$ and $T_B'$, and then the node A and the node B receive corresponding beacon frames and establish super frames.

In the foregoing technical solution, on a basis of the foregoing embodiments, a corresponding working period is configured for each node in a network; in this way, it can be implemented that an updated beacon frame is sent to implement an adjustment of the working period of each node, and network resources in a personal area network can also be properly utilized.

Figure 6:
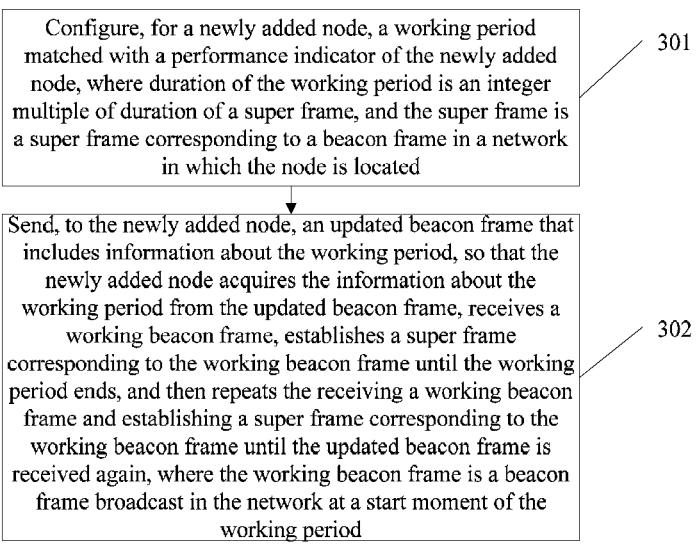
FIG. 6 is a schematic flowchart of another node scheduling method according to an embodiment of the present invention.

FIG. 6 is a schematic flowchart of another node scheduling method according to an embodiment of the present invention. As shown in FIG. 6, the method includes:

301. Configure, for a newly added node, a working period matched with a performance indicator of the newly added node, where duration of the working period is an integer multiple of duration of a super frame, and the super frame is a super frame corresponding to a beacon frame in a network in which the node is located.

Optionally, the foregoing newly added node may be a newly added node in the foregoing network.

302. Send, to the newly added node, an updated beacon frame that includes information about the working period, so that the newly added node acquires the information about the working period from the updated beacon frame, receives a working beacon frame, establishes a super frame corresponding to the working beacon frame until the working period ends, and then repeats the receiving a working beacon frame and establishing a super frame corresponding to the working beacon frame until the updated beacon frame is received again, where the working beacon frame is a beacon frame broadcast in the network at a start moment of the working period.

Optionally, duration of super frames corresponding to all beacon frames in the foregoing network may be the same, that is, duration of super frames established by nodes is the same.

Optionally, the foregoing network may be a personal area network.

In an optional implementation manner, the updated beacon frame may include:

a super-frame specification field and a beacon payload field; where the $13^{th}$ bit of the super-frame specification field is set to 1, the beacon payload field includes a period allocation field, the period allocation field includes an updated quantity of nodes, a beacon order, and a period allocation list, the beacon order is used to indicate duration of a super frame corresponding to the updated beacon frame, the period allocation list includes at least one period allocation descriptor, and the period allocation descriptor includes an address of a node and information that corresponds to the address of the node and is about times of the duration of the super frame;

the updated quantity of nodes is a quantity of the newly added node; and the period allocation list includes a period allocation descriptor, where a quantity of the period allocation descriptor is the quantity of the newly added node, one period allocation descriptor corresponds to one newly added node, and the duration of the working period of the newly added node is equal to the duration of the super frame multiplied by the times, where the times are included in the period allocation descriptor.

Optionally, the foregoing newly added node may include a plurality of nodes or one node.

Optionally, when acquiring the foregoing super-frame specification field, and discovering that the $13^{th}$ bit of the foregoing super-frame specification field is 1, the foregoing newly added node acquires the beacon payload field in the beacon frame, acquires the period allocation field, and acquires the period allocation descriptor that includes the address of the newly added node, so as to obtain the information about the times of the duration of the super frame. In this way, the duration of the working period of the newly added node can be obtained, thereby timing the working period and receiving a beacon frame that is sent at a start moment of the working period.

In the foregoing technical solution, on a basis of the foregoing embodiments, configuring a working period for a newly added node is described with emphasis, so as to implement that the working period matched with a performance indicator of the newly added node is applicable to working of the newly added node, and implement proper utilization of network resources in a personal area network.

Figure 7:
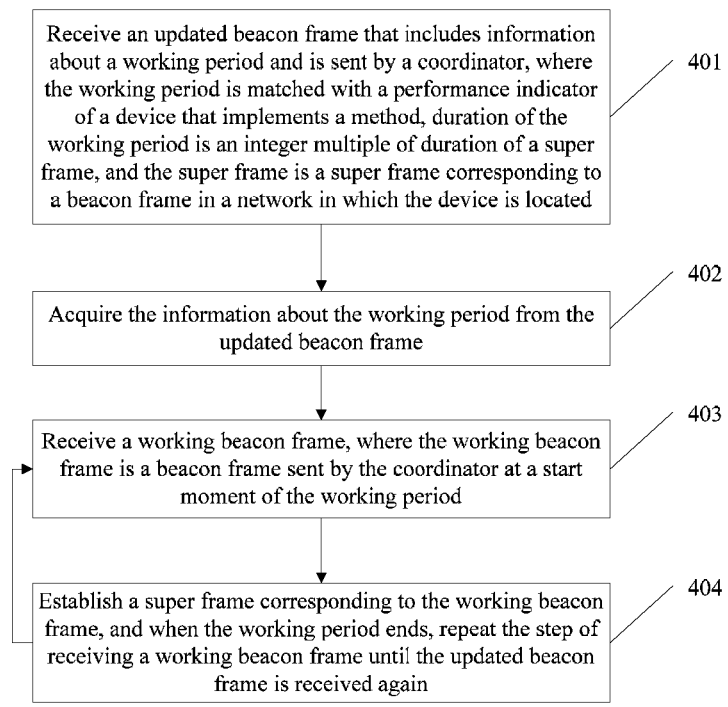
FIG. 7 is a schematic flowchart of another node scheduling method according to an embodiment of the present invention.

FIG. 7 is a schematic flowchart of another node scheduling method according to an embodiment of the present invention. As shown in FIG. 7, the method includes:

401. Receive an updated beacon frame that includes information about a working period and is sent by a coordinator, where the working period is matched with a performance indicator of a device that implements the method, duration of the working period is an integer multiple of duration of a super frame, and the super frame is a super frame corresponding to a beacon frame in a network in which the device is located.

Optionally, the foregoing device that implements the method may be a node device in a network, such as an electricity meter, a water meter, or a gas meter in a personal area network, the node device may further be a wireless sensing node device in a wireless monitoring system based on a wireless sensor network, and the node device may further be a wireless sensing node device in a wireless smart household system based on a wireless sensor network.

Optionally, duration of super frames corresponding to all beacon frames in the foregoing network may be the same, that is, duration of super frames established by nodes is the same.

In an optional implementation manner, the foregoing performance indicator may include at least one of the following:

residual energy of node energy, a data receiving and sending throughput, a data reporting frequency, and an alarm delay.

Optionally, lower residual energy of node energy indicates longer duration of the working period in step 401; on the contrary, higher residual energy of node energy indicates shorter duration of the working period in step 401.

Optionally, a lower data receiving and sending throughput of the node device indicates longer duration of the working period in step 401; on the contrary, a higher data receiving and sending throughput of the node device indicates shorter duration of the working period in step 401.

Optionally, a lower data reporting frequency of the node device indicates longer duration of the working period in step 401; on the contrary, a higher data reporting frequency of the node device indicates shorter duration of the working period in step 401.

Optionally, a longer alarm delay of the node device indicates longer duration of the configured working period in step 401; on the contrary, a shorter alarm delay of the node device indicates shorter duration of the working period configured in step 401.

402. Acquire the information about the working period from the updated beacon frame.

403. Receive a working beacon frame, where the working beacon frame is a beacon frame sent by the coordinator at a start moment of the working period.

404. Establish a super frame corresponding to the working beacon frame, and when the working period ends, repeat the step of receiving a working beacon frame until the updated beacon frame is received again.

Optionally, the working beacon frame is the beacon frame sent by the coordinator at the start moment of the working period, that is, time at which the foregoing coordinator sends the working beacon frame is the same as the foregoing start time of the working period. In this case, in step 404, when the working period ends, the receiving a working beacon frame is repeated; in this way, only one working beacon frame is received in each working period, that is, one beacon frame is received within one working period, and the beacon frame sent by the foregoing coordinator at the start moment of timing of the working period is received.

In the foregoing technical solution, an updated beacon frame that includes information about a working period and is sent by a coordinator is received, a working beacon frame is received, where the working beacon frame is a beacon frame sent by the coordinator at a start moment of the working period; a super frame corresponding to the working beacon frame is established, and when the working period ends, the step of receiving a working beacon frame is repeated until the updated beacon frame is received again. The foregoing working period is configured by the coordinator based on a performance indicator, that is, the working period is matched with the performance indicator; therefore, network resources can be properly utilized.

Figure 8:
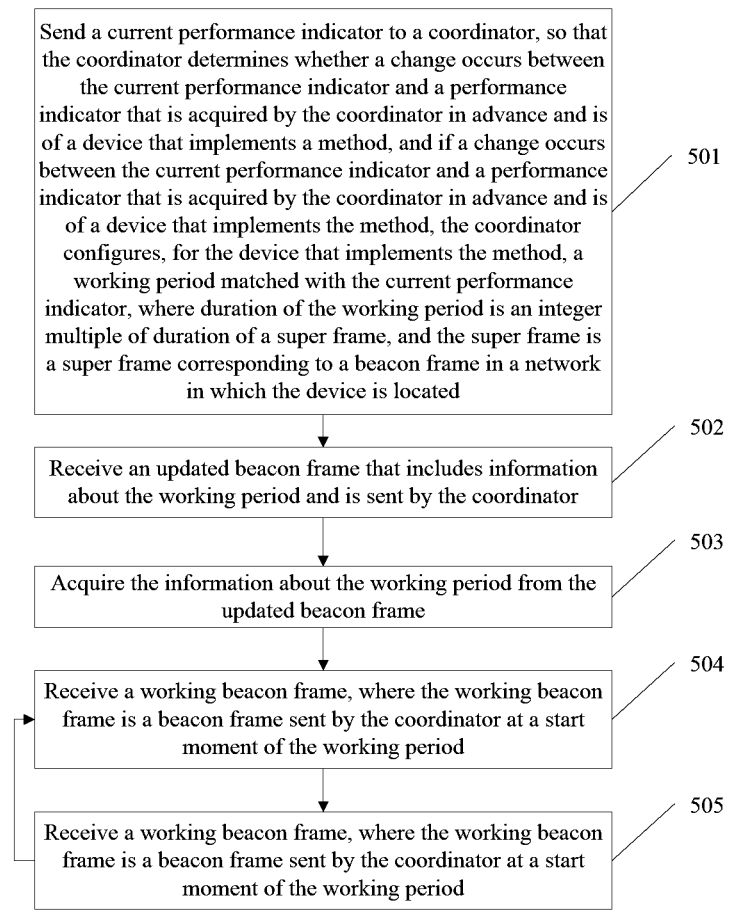
FIG. 8 is a schematic flowchart of another node scheduling method according to an embodiment of the present invention.

FIG. 8 is a schematic flowchart of another node scheduling method according to an embodiment of the present invention. As shown in FIG. 8, the method includes:

501. Send a current performance indicator to a coordinator, so that the coordinator determines whether a change occurs between the current performance indicator and a performance indicator that is acquired by the coordinator in advance and is of a device that implements the method, and if a change occurs between the current performance indicator and a performance indicator that is acquired by the coordinator in advance and is of a device that implements the method, the coordinator configures, for the device that implements the method, a working period matched with the current performance indicator, where duration of the working period is an integer multiple of duration of a super frame, and the super frame is a super frame corresponding to a beacon frame in a network in which the device is located.

Optionally, step 501 may be performed periodically, for example, once a day. In this way, the coordinator can learn in time a performance indicator that is of each device and is managed by the coordinator, and configure an updated working period for each device.

502. Receive an updated beacon frame that includes information about the working period and is sent by the coordinator.

Optionally, step 502 may include:

receiving the updated beacon frame that includes the information about the working period and is sent by the coordinator, where the working period is matched with the current performance indicator.

In this implementation manner, instant update of a working period can be implemented.

503. Acquire the information about the working period from the updated beacon frame.

In an optional implementation manner, the updated beacon frame may include:

a super-frame specification field and a beacon payload field; where the $13^{th}$ bit of the super-frame specification field is set to 1, the beacon payload field includes a period allocation field, the period allocation field includes an updated quantity of devices, a beacon order, and a period allocation list, the beacon order is used to indicate duration of a super frame corresponding to the updated beacon frame, the period allocation list includes at least one period allocation descriptor, and the period allocation descriptor includes an address of a device and information about times of the duration of the super frame; and one period allocation descriptor corresponds to one device, and duration of a working period corresponding to each device is equal to the duration of the super frame multiplied by the times, where the times are included in the period allocation descriptor corresponding to the device.

The foregoing updated quantity of nodes is a quantity of all devices that are in the network and of which working periods need to be updated.

Optionally, in this implementation manner, step 503 may include:

acquiring the beacon order from the updated beacon frame, and obtaining, by calculation, the duration of the super frame corresponding to the updated beacon frame; and acquiring, from the period allocation list, an allocation descriptor that includes the address of the device that implements the method, acquiring the information about the times of the duration of the super frame from the acquired allocation descriptor, and using the duration of the super frame multiplied by the times as the duration of the working period.

For example, the address of the device that implements the method is an address 1, in step 503, an allocation descriptor that includes the address 1 is acquired, and information about times of the duration of the super frame is acquired from the allocation descriptor. If the information about the times is 5 times, and the foregoing duration of the super frame is 10 ms, then it is learned that the duration of the foregoing working period is 50 ms. That is, one beacon frame is received within 50 ms, and a beacon frame sent by the coordinator at a start moment of a timing process of the 50 ms is received.

504. Receive a working beacon frame, where the working beacon frame is a beacon frame sent by the coordinator at a start moment of the working period.

In an optional implementation manner, after the information about the foregoing working period is acquired, time at which the coordinator sends the working beacon frame, that is, the start moment of the working period can be learned according to the information about the working period.

Optionally, step 504 may be that the working period is timed, and the working beacon frame is received.

505. Establish a super frame corresponding to the working beacon frame, and when the working period ends, repeat the step of receiving a working beacon frame until the updated beacon frame is received again.

In an optional implementation manner, after step 502 and before step 504, the method may further include:

establishing a super frame corresponding to the updated beacon frame.

Step 504 may further include:

after the super frame ends, receiving the working beacon frame at the start moment of the working period.

Optionally, step 504 may include:

when the super frame ends, timing the working period, and receiving the working beacon frame at the start moment of the working period.

Optionally, in this implementation manner, as shown in FIG. 5, the device that implements the method is a node B shown in FIG. 5. In step 502, an updated beacon frame (such as the $0^{th}$ beacon frame shown in FIG. 5) that includes information about a working period is received. After step 502, step 503 may be performed, and a super frame corresponding to the updated beacon frame may be established. In step 504, when the established super frame ends, timing of the working period starts; at this moment, a coordinator sends the $1^{st}$ beacon frame, where time at which the $1^{st}$ beacon frame is sent is a start moment of the working period, that is, the $1^{st}$ beacon frame is a working beacon frame. In this case, in step 504, the beacon frame is received. However, in step 505, when a super frame established according to the beacon frame ends, the working period has not ended; timing is continued until the working period ends, and then timing the working period in step 504 is repeated. In this case, the coordinator sends the $3^{rd}$ beacon frame, where time at which the $3^{rd}$ beacon frame is sent is the start moment of the working period, that is, the $3^{rd}$ beacon frame is a working beacon frame. In this case, in step 504, the beacon frame is received, and in step 505, a super frame is established according to the beacon frame. In this way, step 504 and step 505 are repeated until a beacon frame, which corresponds to a character "a super frame including a period allocation field" and is shown, in the first line and the second line, on the right side of FIG. 5, is received, and a super frame corresponding to the beacon frame is established. When the super frame ends, a new working period included in the beacon frame is timed, a beacon frame sent by the coordinator at a start moment of the new working period is received, and a super frame is established to repeat the steps.

In the foregoing technical solution, on a basis of the foregoing embodiments, a step of sending a current performance indicator to a coordinator is added. In this way, the coordinator can configure in time a working period matched with the current performance indicator; and therefore, network resources can be properly utilized.

The following are apparatus embodiments of the present invention, and the apparatus embodiments of the present invention are used to execute methods implemented in the first embodiments to the second embodiment of the present invention. For ease of description, only a part related to embodiments of the present invention is shown. For specific technical details that are not disclosed, refer to the first embodiment and the second embodiment of the present invention.

Figure 9:
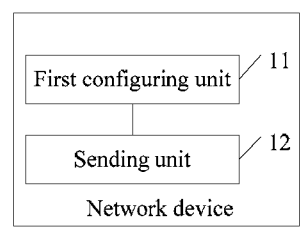
FIG. 9 is a schematic structural diagram of a network device according to an embodiment of the present invention.

FIG. 9 is a schematic structural diagram of a network device according to an embodiment of the present invention. As shown in FIG. 9, the network device includes a first configuring unit 11 and a sending unit 12, where the first configuring unit 11 is configured to configure, for a node, a working period matched with a performance indicator of the node, where duration of the working period is an integer multiple of duration of a super frame, and the super frame is a super frame corresponding to a beacon frame in a network in which the node is located.

Optionally, the foregoing working period matched with the performance indicator of the node may refer to a working period in which network resources are reduced as much as possible on a premise that a requirement of the performance indicator of the node is met. For example, a higher requirement of the performance indicator indicates longer duration of the working period matched with the performance indicator, and a lower requirement of the performance indicator indicates shorter duration of the working period matched with the performance indicator. For example, a requirement of a performance indicator of the foregoing node is that a data throughput is low, and a data reporting frequency is low, in this case, a working period with relatively long duration may be configured for the node.

In an optional implementation manner, the foregoing performance indicator may include at least one of the following:

residual energy of node energy, a data receiving and sending throughput, a data reporting frequency, and an alarm delay.

Optionally, lower residual energy of node energy indicates longer duration of the working period configured by the first configuring unit 11; on the contrary, higher residual energy of node energy indicates shorter duration of the working period configured by the first configuring unit 11.

Optionally, a lower data receiving and sending throughput of a node device indicates longer duration of the working period configured by the first configuring unit 11; on the contrary, a higher data receiving and sending throughput of the node device indicates shorter duration of the working period configured by the first configuring unit 11.

Optionally, a lower data reporting frequency of a node device indicates longer duration of the working period configured by the first configuring unit 11; on the contrary, a higher data reporting frequency of the node device indicates shorter duration of the working period configured by the first configuring unit 11.

Optionally, a longer alarm delay of a node device indicates longer duration of the working period configured by the first configuring unit 11; on the contrary, a shorter alarm delay of the node device indicates shorter duration of the working period configured by the first configuring unit 11.

The sending unit 12 is configured to send, to the node, an updated beacon frame that includes information about the working period, so that the node acquires the information about the working period from the updated beacon frame, receives a working beacon frame, establishes a super frame corresponding to the working beacon frame until the working period ends, and then repeats the receiving a working beacon frame and establishing a super frame corresponding to the working beacon frame until the updated beacon frame is received again, where the working beacon frame is a beacon frame broadcast in the network at a start moment of the working period.

Optionally, when receiving the foregoing updated beacon frame, the foregoing node may acquire the information about the working period from the updated beacon frame, receive a working beacon frame, establish a super frame corresponding to the working beacon frame until the working period ends, and then repeat the receiving a working beacon frame and establishing a super frame corresponding to the working beacon frame until the updated beacon frame is received again.

Optionally, the foregoing working period may further include:

a listening period and a sleep period, where the listening period is an earlier part of the working period, duration of the listening period is equal to duration of an active period of the super frame corresponding to the foregoing working beacon frame, and the rest part of the working period is the sleep period. That is, the node establishes a super frame in the listening period of the working period, and is in an active state in the active period of the super frame, and when an inactive period of the super frame starts, the node enters the sleep period and is in a sleep state.

In an optional implementation manner, the network device may be a coordinator in a personal area network, in a wireless monitoring system based on a wireless sensor network, or in a wireless smart household system based on a wireless sensor network.

In the foregoing technical solution, a working period matched with a performance indicator of a node is configured for the node, and an updated beacon frame that includes information about the working period is sent to the node, so that the node acquires the information about the working period from the updated beacon frame, receives a working beacon frame, establishes a super frame corresponding to the working beacon frame until the working period ends, and then repeats the receiving a working beacon frame and establishing a super frame corresponding to the working beacon frame until the updated beacon frame is received again. A working period matched with a performance indicator of a node is configured for the node, the node receives a working beacon frame in the working period, and the working beacon frame is a beacon frame sent by a coordinator at a start moment of the working period; in this way, it can be implemented that only one beacon frame is received within one working period. Compared with the prior art in which all node devices receive all beacon frames, the present invention can make a network resource in a personal area network be properly utilized.

Figure 10:
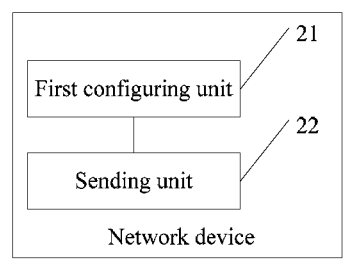
FIG. 10 is a schematic structural diagram of another network device according to an embodiment of the present invention.

FIG. 10 is a schematic structural diagram of another network device according to an embodiment of the present invention. As shown in FIG. 10, the network device includes a first configuring unit 21 and a sending unit 22, where the first configuring unit 21 is configured to separately configure, for each node in a pre-specified network, a working period matched with a performance indicator of the node, where duration of the working period is an integer multiple of duration of a super frame, and the super frame is a super frame corresponding to a beacon frame in the network in which the node is located.

Optionally, the foregoing pre-specified network may be a personal area network, a wireless monitoring system based on a wireless sensor network, or a wireless smart household system based on a wireless sensor network.

Optionally, duration of super frames corresponding to all beacon frames in the foregoing network may be the same, that is, duration of super frames established by nodes is the same.

In an optional implementation manner, an application scenario of this embodiment may be shown in FIG. 3. The foregoing network includes a node A, a node B, a node C, a node D, and a node E. A device for implementing the present invention may be a coordinator. That is, the first configuring unit 21 separately configures, for the foregoing node A, node B, node C, node D, and node E, a working period matched with a performance indicator of each node. That is, a same or different working period may be configured for each node.

The sending unit 22 is configured to send, to each node, an updated beacon frame that includes information about the working period, so that each node acquires, from the updated beacon frame, the information about the working period of the node, and the node receives a working beacon frame, establishes a super frame corresponding to the working beacon frame until the working period ends, and then repeats the receiving a working beacon frame and establishing a super frame corresponding to the working beacon frame until the updated beacon frame is received again, where the working beacon frame is a beacon frame broadcast in the network at a start moment of the working period.

In an optional implementation manner, the foregoing updated beacon frame may be a start beacon frame in the foregoing network, that is, the first beacon frame sent to the foregoing node in the foregoing network. Certainly, the foregoing updated beacon frame may also be another beacon frame, for example, a beacon frame, where a difference of a specific period exists between sending time of the beacon frame and that of the first beacon frame. That is, the foregoing first configuring unit 21 and sending unit 22 are periodically performed. In this way, it can be implemented that a working period of a node is periodically updated.

In an optional implementation manner, the updated beacon frame includes:

a super-frame specification field and a beacon payload field; where the 13$^{th}$ bit of the super-frame specification field is set to 1, the beacon payload field includes a period allocation field, the period allocation field includes an updated quantity of nodes, a beacon order, and a period allocation list, the beacon order is used to indicate duration of a super frame corresponding to the updated beacon frame, the period allocation list includes at least one period allocation descriptor, and the period allocation descriptor includes an address of a node and information about times of the duration of the super frame;

the updated quantity of nodes is a quantity of all nodes in the network; and the period allocation list includes a period allocation descriptor, where a quantity of the period allocation descriptor is the quantity of all nodes in the network, one period allocation descriptor corresponds to one node, and duration of the working period of each node is equal to the duration of the super frame multiplied by the times, where the times are included in the period allocation descriptor corresponding to the node.

Optionally, the foregoing super-frame specification field may be shown in the following table:

| Bits: 0-3 | 4-7 | 8-11 | 12 | 13 | 14 | 15 |
|---|---|---|---|---|---|---|
| Beacon sequence | Super frame sequence | Last timeslot of a CAP | Battery life extension (BLE) | Listening and sleep period allocation | PAN coordinator | Association permit |

Optionally, in this embodiment, a beacon frame broadcast in a network (such as a beacon frame sent by a coordinator) is sent to all nodes; however, each node receives only a beacon frame that is broadcast in the network at a start moment of a working period of the node. When a beacon frame includes information about the foregoing working period, the beacon frame is defined as an updated beacon frame, and the 13$^{th}$ bit of a super-frame specification field in the beacon frame is set to 1, and if the beacon frame is not an updated beacon frame, the 13$^{th}$ bit of the super-frame specification field in the beacon frame is set to 0. When learning that the 13$^{th}$ bit of a super-frame specification field in a beacon frame is set to 0, a node acquires a beacon payload field in the beacon frame, and acquires a period allocation field included in the beacon payload field.

Optionally, the foregoing period allocation field may be shown in the following table:

| Quantity of bits: 8 | Quantity of bits: 8 | Variable |
|---|---|---|
| Updated quantity of nodes | Beacon order (BO) | Period allocation list |

Optionally, the foregoing period allocation descriptor may be shown in the following table:

| Bits: 0-15 | 16-23 |
|---|---|
| Short address of a device | Times relationship between duration of a working period and duration of a super frame |

Optionally, when the foregoing quantity of nodes in the network is 10, the foregoing updated quantity of nodes is 10, and the foregoing period allocation list may include 10 period allocation descriptors, where each period allocation descriptor includes an address of one node and information that corresponds to the address of the node and is about times of the duration of the super frame. The foregoing information about the times of the duration of the super frame may be specifically one numeral, such as 5 times or 10 times. For example, information that corresponds to a node 1 and is about times of the duration of the super frame is 5 times, and the duration of the super frame is 10 ms, then duration of a working period of the node 1 is 50 ms.

In an optional implementation manner, the network device may further include:

a determining unit (not drawn in the accompany drawings), configured to: receive a current performance indicator reported by each node in the network, and separately determine whether a change occurs between the received current performance indicator of each node and a performance indicator that is acquired in advance and is of the node; and the first configuring unit 21 may be further configured to: when a result of determining by the determining unit (not drawn in the accompany drawings) is yes, configure, for a node on which it is determined that a change occurs, a working period matched with the current performance indicator of the node on which it is determined that a change occurs; and the sending unit 22 may be further configured to send, to the node on which it is determined that a change occurs, an updated beacon frame that includes information about the working period.

In this implementation manner, it can be implemented that, a working period is configured only for the node on which it is determined that a change occurs, the information about the working period is sent only to the node on which it is determined that a change occurs, and the working period is configured according to a current performance indicator; in this way, real-time update of a working period of a node can be implemented, thereby maximizing utilization of network resources.

Optionally, in this implementation manner, for the updated beacon frame, refer to the beacon frame in the foregoing implementation manners. That is, the updated beacon frame includes a super-frame specification field and a beacon payload field. The foregoing updated quantity of nodes is a quantity of the node on which it is determined that a change occurs, and each period allocation descriptor in the period allocation list corresponds to one node on which it is determined that a change occurs.

Figure 11:
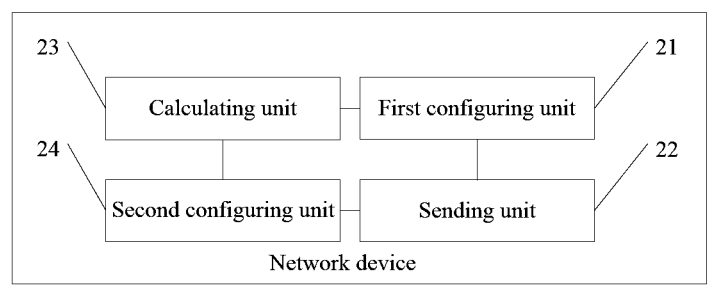
FIG. 11 is a schematic structural diagram of another network device according to an embodiment of the present invention.

In an optional implementation manner, as shown in FIG. 11, the network device may further include:

a calculating unit 23, configured to: when a current beacon frame needs to be broadcast, obtain, by calculation according to a working period allocated to each node in the network, at least one node that can receive the current beacon frame, and use the at least one node as a group; and a second configuring unit 24, configured to configure, according to a GTS request sent in a previous super frame that is established, on each node, by the node in the group, a GTS field included in the current beacon frame, where the GTS field is used to identify a node that is assigned to the group in a contention free period of a super frame corresponding to the current beacon frame, and the previous super frame established by the node is a previous super frame of the super frame that corresponds to the current beacon frame and is established by the node; and the sending unit 22 may be further configured to send the current beacon frame to the node in the group.

Optionally, in this implementation manner, the current beacon frame may be any beacon frame after the foregoing updated beacon frame.

For example, the foregoing group includes a node A and a node B, that is, only the node A and the node B can receive the foregoing current beacon frame. In this case, the second configuring unit 24 can configure, according to a GTS request that corresponds to the node A and the node B and is sent in a previous super frame, a GTS field included in the current beacon frame. For example, as shown in FIG. 5, the foregoing current beacon frame is the $3^{rd}$ beacon frame, in this case, the node A and the node B receive the beacon frame respectively in the third working period and the second working period, and before the node A and the node B receive the beacon frame, a super frame established by the node A and the node B (that is, the previous super frame, in the second configuring unit 24, which is established by the node) is a super frame corresponding to the $1^{st}$ beacon frame, that is, the third super frame and the second super frame respectively established by the node A and the node B. In this case, the second configuring unit 24 configures, according to a GTS request sent in the third super frame and the second super frame that are respectively established by the node A and the node B, a GTS field included in the $3^{rd}$ beacon frame, that is, a contention free period of a super frame corresponding to the $3^{rd}$ beacon frame is assigned to the node A and the node B.

It should be noted that the foregoing technology for receiving a GTS request and allocating a contention free period is the prior art, and details are not described herein.

In an optional implementation manner, the first configuring unit 21 may be further configured to configure, for a newly added node, a working period matched with a performance indicator of the newly added node, where duration of the working period is an integer multiple of duration of a super frame, and the super frame is a super frame corresponding to a beacon frame in a network in which the node is located.

Optionally, the foregoing newly added node may be a newly added node in the foregoing network.

Optionally, the sending unit 22 may be further configured to send, to the newly added node, an updated beacon frame that includes information about the working period, so that the newly added node acquires the information about the working period from the updated beacon frame, receives a working beacon frame, establishes a super frame corresponding to the working beacon frame until the working period ends, and then repeats the receiving a working beacon frame and establishing a super frame corresponding to the working beacon frame until the updated beacon frame is received again, where the working beacon frame is a beacon frame broadcast in the network at a start moment of the working period.

Optionally, the updated beacon frame may include:

a super-frame specification field and a beacon payload field; where the $13^{th}$ bit of the super-frame specification field is set to 1, the beacon payload field includes a period allocation field, the period allocation field includes an updated quantity of nodes, a beacon order, and a period allocation list, the beacon order is used to indicate duration of a super frame corresponding to the updated beacon frame, the period allocation list includes at least one period allocation descriptor, and the period allocation descriptor includes an address of a node and information that corresponds to the address of the node and is about times of the duration of the super frame;

the updated quantity of nodes is a quantity of the newly added node; and the period allocation list includes a period allocation descriptor, where a quantity of the period allocation descriptor is the quantity of the newly added node, one period allocation descriptor corresponds to one newly added node, and the duration of the working period of the newly added node is equal to the duration of the super frame multiplied by the times, where the times are included in the period allocation descriptor.

Optionally, the foregoing newly added node may include a plurality of nodes or one node.

Optionally, when acquiring the foregoing super-frame specification field, and discovering that the $13^{th}$ bit of the foregoing super-frame specification field is 1, the foregoing newly added node acquires the beacon payload field in the beacon frame, acquires the period allocation field, and acquires the period allocation descriptor that includes the address of the newly added node, so as to obtain the information about the times of the duration of the super frame. In this way, the duration of the working period of the newly added node can be obtained, thereby timing the working period and receiving a beacon frame that is sent at a start moment of the working period.

In this implementation manner, it is implemented that a working period is configured for a newly added node, so as to implement that the working period matched with a performance indicator of the newly added node is applicable to working of the newly added node.

In the foregoing technical solution, on a basis of the foregoing embodiments, a corresponding working period is configured for each node in a network; in this way, it can be implemented that an updated beacon frame is sent to implement an adjustment of the working period of each node, and network resources in a personal area network can also be properly utilized.

Figure 12:
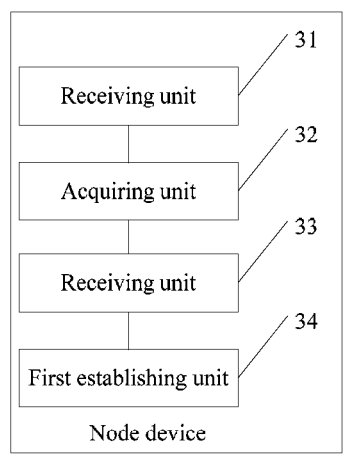
FIG. 12 is a schematic structural diagram of a node device according to an embodiment of the present invention.

FIG. 12 is a schematic structural diagram of a node device according to an embodiment of the present invention. As shown in FIG. 12, the node device includes a receiving unit 31, an acquiring unit 32, a receiving unit 33, and a first establishing unit 34, where the receiving unit 31 is configured to receive an updated beacon frame that includes information about a working period and is sent by a coordinator, where the working period is matched with a performance indicator of the node device, duration of the working period is an integer multiple of duration of a super frame, and the super frame is a super frame corresponding to a beacon frame in a network in which the node device is located.

Optionally, the node device may be a node device in a network, such as an electricity meter, a water meter, or a gas meter in a personal area network, the node device may further be a wireless sensing node device in a wireless monitoring system based on a wireless sensor network, and the node device may further be a wireless sensing node device in a wireless smart household system based on a wireless sensor network.

Optionally, duration of super frames corresponding to all beacon frames in the foregoing network may be the same, that is, duration of super frames established by nodes is the same.

In an optional implementation manner, the foregoing performance indicator may include at least one of the following:

residual energy of node energy, a data receiving and sending throughput, a data reporting frequency, and an alarm delay.

Optionally, lower residual energy of node energy indicates longer duration of the working period of the receiving unit 31; on the contrary, higher residual energy of node energy indicates shorter duration of the working period of the receiving unit 31.

Optionally, a lower data receiving and sending throughput of the node device indicates longer duration of the working period of the receiving unit 31; on the contrary, a higher data receiving and sending throughput of the node device indicates shorter duration of the working period of the receiving unit 31.

Optionally, a lower data reporting frequency of the node device indicates longer duration of the working period of the receiving unit 31; on the contrary, a higher data reporting frequency of the node device indicates shorter duration of the working period of the receiving unit 31.

Optionally, a longer alarm delay of the node device indicates longer duration of the working period configured of the receiving unit 31; on the contrary, a shorter alarm delay of the node device indicates shorter duration of the working period configured of the receiving unit 31.

The acquiring unit 32 is configured to acquire the information about the working period from the updated beacon frame;

the receiving unit 33 is configured to receive a working beacon frame, where the working beacon frame is a beacon frame sent by the coordinator at a start moment of the working period;

the first establishing unit 34 is configured to establish a super frame corresponding to the working beacon frame; and the receiving unit 33 is further configured to: when the working period ends, repeat the receiving a working beacon frame until the updated beacon frame is received again.

Optionally, the working beacon frame is the beacon frame sent by the coordinator at the start moment of the working period, that is, time at which the foregoing coordinator sends the working beacon frame is the same as the foregoing start time of timing of the working period. In this case, when the working period ends, the receiving unit 33 repeats the receiving a working beacon frame; in this way, only one working beacon frame is received in each working period, that is, one beacon frame is received within one working period, and the beacon frame sent by the foregoing coordinator at the start moment of timing of the working period is received.

In the foregoing technical solution, an updated beacon frame that includes information about a working period and is sent by a coordinator is received, a working beacon frame is received, where the working beacon frame is a beacon frame sent by the coordinator at a start moment of the working period; a super frame corresponding to the working beacon frame is established, and when the working period ends, the step of receiving a working beacon frame is repeated until the updated beacon frame is received again. The foregoing working period is configured by the coordinator based on a performance indicator, that is, the working period is matched with the performance indicator; therefore, network resources can be properly utilized.

Figure 13:
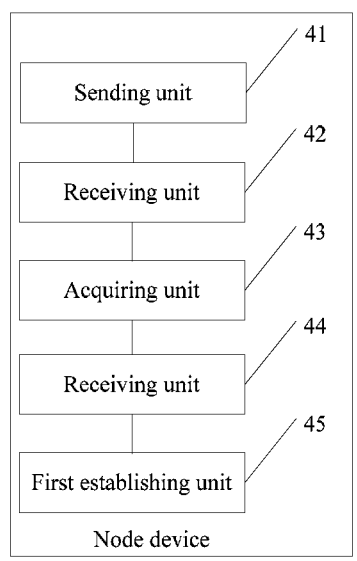
FIG. 13 is a schematic structural diagram of another node device according to an embodiment of the present invention.

FIG. 13 is a schematic structural diagram of another node device according to an embodiment of the present invention. As shown in FIG. 13, the node device includes a sending unit 41, a receiving unit 42, an acquiring unit 43, a receiving unit 44, and a first establishing unit 45.

The sending unit 41 is configured to send a current performance indicator to a coordinator, so that the coordinator determines whether a change occurs between the current performance indicator and a performance indicator that is acquired by the coordinator in advance and is of the node device, and if a change occurs between the current performance indicator and a performance indicator that is acquired by the coordinator in advance and is of the node device, the coordinator configures, for the node device, a working period matched with the current performance indicator, where duration of the working period is an integer multiple of duration of a super frame, and the super frame is a super frame corresponding to a beacon frame in a network in which the device is located.

The receiving unit 42 is configured to receive an updated beacon frame that includes the information about the working period and is sent by the coordinator.

In an optional implementation manner, the receiving unit 42 may be further configured to receive the updated beacon frame that includes the information about the working period and is sent by the coordinator, where the working period is matched with the current performance indicator.

In this implementation manner, instant update of a working period can be implemented.

The acquiring unit 43 is configured to acquire the information about the working period from the updated beacon frame.

In an optional implementation manner, the updated beacon frame may include:

a super-frame specification field and a beacon payload field; where the $13^{th}$ bit of the super-frame specification field is set to 1, the beacon payload field includes a period allocation field, the period allocation field includes an updated quantity of devices, a beacon order, and a period allocation list, the beacon order is used to indicate duration of a super frame corresponding to the updated beacon frame, the period allocation list includes at least one period allocation descriptor, and the period allocation descriptor includes an address of a device and information about times of the duration of the super frame; and one period allocation descriptor corresponds to one device, and duration of a working period corresponding to each device is equal to the duration of the super frame multiplied by the times, where the times are included in the period allocation descriptor corresponding to the device.

The foregoing updated quantity of nodes is a quantity of all devices that are in the network and of which working periods need to be updated.

Optionally, in this implementation manner, the acquiring unit 43 may include:

a calculating unit (not drawn in the accompany drawings), configured to: acquire the beacon order from the updated beacon frame, and obtain, by calculation, the duration of the super frame corresponding to the updated beacon frame; and an acquiring subunit (not drawn in the accompany drawings), configured to: acquire, from the period allocation list, an allocation descriptor that includes the address of the node device, acquire the information about the times of the duration of the super frame from the acquired allocation descriptor, and use the duration of the super frame multiplied by the times as the duration of the working period.

For example, the address of the device that implements the method is an address 1, the acquiring unit 43 acquires an allocation descriptor that includes the address 1, and acquires information about times of the duration of the super frame from the allocation descriptor. If the information about the times is 5 times, and the foregoing duration of the super frame is 10 ms, then it is learned that the duration of the foregoing working period is 50 ms. That is, one beacon frame is received within 50 ms, and a beacon frame sent by the coordinator at a start moment of a timing process of the 50 ms is received.

The receiving unit 44 is configured to receive a working beacon frame, where the working beacon frame is a beacon frame sent by the coordinator at a start moment of the working period.

In an optional implementation manner, after the information about the foregoing working period is acquired, time at which the coordinator sends the working beacon frame, that is, the start moment of the working period can be learned according to the information about the working period.

Optionally, the receiving unit 44 may be configured to time the working period and receive the working beacon frame.

The first establishing unit 45 is configured to establish a super frame corresponding to the working beacon frame.

The receiving unit 44 is further configured to: when the working period ends, repeat the receiving a working beacon frame until the updated beacon frame is received again.

In an optional implementation manner, the node device may further include:

a second establishing unit (not drawn in the accompany drawings), configured to establish a super frame corresponding to the updated beacon frame.

The receiving unit 44 may be further configured to: after the super frame ends, receive the working beacon frame at the start moment of the working period.

Optionally, the receiving unit 44 may be further configured to: when the super frame ends, time the working period, and receive the working beacon frame at the start moment of the working period.

Optionally, in this implementation manner, as shown in FIG. 5, the device that implements the method is a node B shown in FIG. 5. The receiving unit 42 receives an updated beacon frame (such as the $0^{th}$ beacon frame shown in FIG. 5) that includes information about a working period. The acquiring unit 43 acquires the information about the working period, and the second establishing unit (not drawn in the accompany drawings) establishes a super frame corresponding to the updated beacon frame. When the established super frame ends, the receiving unit 44 starts to time the working period starts; at this moment, a coordinator sends the $1^{st}$ beacon frame, where time at which the $1^{st}$ beacon frame is sent is a start moment of the working period, that is, the $1^{st}$ beacon frame is a working beacon frame. The receiving unit 44 receives the beacon frame. However, when a super frame established by the first establishing unit 45 according to the beacon frame ends, the working period has not ended; timing is continued until the working period ends, and then timing the working period by the receiving unit 44 is repeated. In this case, the coordinator sends the $3^{rd}$ beacon frame, where time at which the $3^{rd}$ beacon frame is sent is the start moment of the working period, that is, the $3^{rd}$ beacon frame is a working beacon frame. The receiving unit 44 receives the beacon frame, and the first establishing unit 45 establishes a super frame according to the beacon frame. The receiving unit 44 and the first establishing unit 45 repeat the execution until a beacon frame, which corresponds to a character "a super frame including a period allocation field" and is shown, in the first line and the second line, on the right side of FIG. 5, is received, and a super frame corresponding to the beacon frame is established. When the super frame ends, a new working period included in the beacon frame is timed, a beacon frame sent by the coordinator at a start moment of the new working period is received, and a super frame is established to repeat the steps.

In the foregoing technical solution, on a basis of the foregoing embodiments, sending of a current performance indicator by a unit to a coordinator is added. In this way, the coordinator can configure in time a working period matched with the current performance indicator; and therefore, network resources can be properly utilized.

Figure 14:
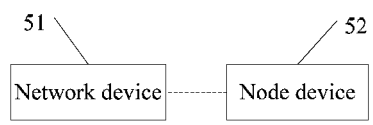
FIG. 14 is a schematic structural diagram of a node scheduling system according to an embodiment of the present invention.

FIG. 14 is a schematic structural diagram of a node scheduling system according to an embodiment of the present invention. As shown in FIG. 14, the system includes a network device 51 and a node device 52.

In an optional implementation manner, the network device 51 may be a network device according to any one of implementation manners in FIG. 9 to FIG. 11.

In an optional implementation manner, the node device 52 may be a node device according to any one of implementation manners in FIG. 12 to FIG. 13.

In the foregoing technical solution, a network device configures, for a node, a working period matched with a performance indicator of the node, and the network device sends, to the node, an updated beacon frame that includes information about the working period; a node device acquires the information about the working period from the updated beacon frame, receives a working beacon frame, establishes a super frame corresponding to the working beacon frame until the working period ends, and then repeats the receiving a working beacon frame and establishing a super frame corresponding to the working beacon frame until the updated beacon frame is received again. A working period matched with a performance indicator of a node is configured for the node, the node device receives a working beacon frame in the working period, and the working beacon frame is a beacon frame sent by a coordinator at a start moment of the working period; in this way, it can be implemented that only one beacon frame is received within one working period. Compared with the prior art in which all node devices receive all beacon frames, the present invention can make network resources in a personal area network be properly utilized.

Figure 15:
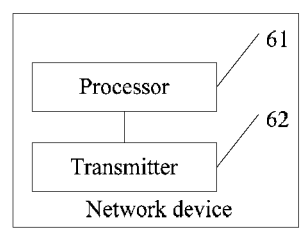
FIG. 15 is a schematic structural diagram of another network device according to an embodiment of the present invention.

FIG. 15 is a schematic structural diagram of another network device according to an embodiment of the present invention. As shown in FIG. 15, the network device includes a processor 61 and a transmitter 62, where the processor 61 is configured to configure, for a node, a working period matched with a performance indicator of the node, where duration of the working period is an integer multiple of duration of a super frame, and the super frame is a super frame corresponding to a beacon frame in a network in which the node is located; and the transmitter 62 is configured to send, to the node, an updated beacon frame that includes information about the working period, so that the node acquires the information about the working period from the updated beacon frame, receives a working beacon frame, establishes a super frame corresponding to the working beacon frame until the working period ends, and then repeats the receiving a working beacon frame and establishing a super frame corresponding to the working beacon frame until the updated beacon frame is received again, where the working beacon frame is a beacon frame broadcast in the network at a start moment of the working period.

In an optional implementation manner, optionally, the foregoing working period matched with the performance indicator of the node may refer to a working period in which network resources are reduced as much as possible on a premise that a requirement of the performance indicator of the node is met. For example, a higher requirement of the performance indicator indicates longer duration of the working period matched with the performance indicator, and a lower requirement of the performance indicator indicates shorter duration of the working period matched with the performance indicator. For example, a requirement of a performance indicator of the foregoing node is that a data throughput is low, and a data reporting frequency is low, in this case, a working period with relatively long duration may be configured for the node.

In an optional implementation manner, the foregoing performance indicator may include at least one of the following:

residual energy of node energy, a data receiving and sending throughput, a data reporting frequency, and an alarm delay.

Optionally, lower residual energy of node energy indicates longer duration of the working period configured by the processor 61; on the contrary, higher residual energy of node energy indicates shorter duration of the working period configured by the processor 61.

Optionally, a lower data receiving and sending throughput of a node device indicates longer duration of the working period configured by the processor 61; on the contrary, a higher data receiving and sending throughput of the node device indicates shorter duration of the working period configured by the processor 61.

Optionally, a lower data reporting frequency of the node device indicates longer duration of the working period configured by the processor 61; on the contrary, a higher data reporting frequency of the node device indicates shorter duration of the working period configured by the processor 61.

Optionally, a longer alarm delay of the node device indicates longer duration of the working period configured by the processor 61; on the contrary, a shorter alarm delay of the node device indicates shorter duration of the working period configured by the processor 61.

Optionally, when receiving the foregoing updated beacon frame, the foregoing node may acquire the information about the working period from the updated beacon frame, receive a working beacon frame, establish a super frame corresponding to the working beacon frame until the working period ends, and then repeat the receiving a working beacon frame and establishing a super frame corresponding to the working beacon frame until the updated beacon frame is received again.

Optionally, the foregoing working period may further include:

a listening period and a sleep period, where the listening period is an earlier part of the working period, duration of the listening period is equal to duration of an active period of the super frame corresponding to the foregoing working beacon frame, and the rest part of the working period is the sleep period. That is, the node establishes a super frame in the listening period of the working period, and is in an active state in the active period of the super frame, and when an inactive period of the super frame starts, the node enters the sleep period and is in a sleep state.

In an optional implementation manner, the network device may be a coordinator in a personal area network, in a wireless monitoring system based on a wireless sensor network, or in a wireless smart household system based on a wireless sensor network.

In the foregoing technical solution, a working period matched with a performance indicator of a node is configured for the node, and an updated beacon frame that includes information about the working period is sent to the node, so that the node acquires the information about the working period from the updated beacon frame, receives a working beacon frame, establishes a super frame corresponding to the working beacon frame until the working period ends, and then repeats the receiving a working beacon frame and establishing a super frame corresponding to the working beacon frame until the updated beacon frame is received again. A working period matched with a performance indicator of a node is configured for the node, the node receives a working beacon frame in the working period, and the working beacon frame is a beacon frame sent by a coordinator at a start moment of the working period; in this way, it can be implemented that only one beacon frame is received within one working period. Compared with the prior art in which all node devices receive all beacon frames, the present invention can make a network resource in a personal area network be properly utilized.

Figure 16:
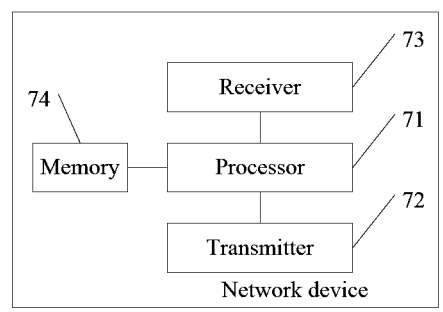
FIG. 16 is a schematic structural diagram of another network device according to an embodiment of the present invention.

FIG. 16 is a schematic structural diagram of another network device according to an embodiment of the present invention. As shown in FIG. 16, the network device includes a processor 71 and a transmitter 72, where the processor 71 is configured to separately configure, for each node in a pre-specified network, a working period matched with a performance indicator of the node, where duration of the working period is an integer multiple of duration of a super frame, and the super frame is a super frame corresponding to a beacon frame in the network in which the node is located; and the transmitter 72 is configured to send, to each node, an updated beacon frame that includes information about the working period, so that each node acquires, from the updated beacon frame, the information about the working period of the node, and the node receives a working beacon frame, establishes a super frame corresponding to the working beacon frame until the working period ends, and then repeats the receiving a working beacon frame and establishing a super frame corresponding to the working beacon frame until the updated beacon frame is received again, where the working beacon frame is a beacon frame broadcast in the network at a start moment of the working period.

Optionally, the foregoing pre-specified network may be a personal area network, a wireless monitoring system based on a wireless sensor network, or a wireless smart household system based on a wireless sensor network.

Optionally, duration of super frames corresponding to all beacon frames in the foregoing network may be the same, that is, duration of super frames established by nodes is the same.

In an optional implementation manner, an application scenario of this embodiment may be shown in FIG. 3. The foregoing network includes a meter node A, a meter node B, a meter node C, a meter node D, and a meter node E. A device for implementing the present invention may be a coordinator R. That is, the processor 71 separately configures, for the foregoing meter node A, meter node B, meter node C, meter node D, and meter node E, a working period matched with a performance indicator of each node. That is, a same or different working period may be configured for each node.

In an optional implementation manner, the foregoing updated beacon frame may be a start beacon frame in the foregoing network, that is, the first beacon frame sent to the foregoing node in the foregoing network. Certainly, the foregoing updated beacon frame may also be another beacon frame.

In an optional implementation manner, the updated beacon frame includes:

a super-frame specification field and a beacon payload field; where the 13$^{th}$ bit of the super-frame specification field is set to 1, the beacon payload field includes a period allocation field, the period allocation field includes an updated quantity of nodes, a beacon order, and a period allocation list, the beacon order is used to indicate duration of a super frame corresponding to the updated beacon frame, the period allocation list includes at least one period allocation descriptor, and the period allocation descriptor includes an address of a node and information about times of the duration of the super frame;

the updated quantity of nodes is a quantity of all nodes in the network; and the period allocation list includes a period allocation descriptor, where a quantity of the period allocation descriptor is the quantity of all nodes in the network, one period allocation descriptor corresponds to one node, and duration of the working period of each node is equal to the duration of the super frame multiplied by the times, where the times are included in the period allocation descriptor corresponding to the node.

Optionally, the foregoing super-frame specification field may be shown in the following table:

| Bits: 0-3 | 4-7 | 8-11 | 12 | 13 | 14 | 15 |
|---|---|---|---|---|---|---|
| Beacon sequence | Super frame sequence | Last timeslot of a CAP | Battery life extension (BLE) | Listening and sleep period allocation | PAN coordinator | Association permit |

Optionally, in this embodiment, a beacon frame broadcast in a network (such as a beacon frame sent by a coordinator) is sent to all nodes; however, each node receives only a beacon frame that is broadcast in the network at a start moment of a working period of the node. When a beacon frame includes information about the foregoing working period, the beacon frame is defined as an updated beacon frame, and the 13$^{th}$ bit of a super-frame specification field in the beacon frame is set to 1, and if the beacon frame is not an updated beacon frame, the 13$^{th}$ bit of the super-frame specification field in the beacon frame is set to 0. When learning that the 13$^{th}$ bit of a super-frame specification field in a beacon frame is set to 0, a node acquires a beacon payload field in the beacon frame, and acquires a period allocation field included in the beacon payload field.

Optionally, the foregoing period allocation field may be shown in the following table:

| Quantity of bits: 8 | Quantity of bits: 8 | Variable |
|---|---|---|
| Updated quantity of nodes | Beacon order (BO) | Period allocation list |

Optionally, the foregoing period allocation descriptor may be shown in the following table:

| Bits: 0-15 | 16-23 |
|---|---|
| Short address of a device | Times relationship between duration of a working period and duration of a super frame |

Optionally, when the foregoing quantity of nodes in the network is 10, the foregoing updated quantity of nodes is 10, and the foregoing period allocation list may include 10 period allocation descriptors, where each period allocation descriptor includes an address of one node and information that corresponds to the address of the node and is about times of the duration of the super frame. The foregoing information about the times of the duration of the super frame may be specifically one numeral, such as 5 times or 10 times. For example, information that corresponds to a node 1 and is about times of the duration of the super frame is 5 times, and the duration of the super frame is 10 ms, then duration of a working period of the node 1 is 50 ms.

In an optional implementation manner, the device may further include:

a receiver 73, configured to receive a current performance indicator reported by each node in the network; and the processor 71 is further configured to perform the following step after the step of sending, to each node, an updated beacon frame that includes information about the working period:

separately determining whether a change occurs between the received current performance indicator of each node and a performance indicator that is acquired in advance and is of the node, and if a change occurs between the received current performance indicator of each node and a performance indicator that is acquired in advance and is of the node, configuring, for a node on which it is determined that a change occurs, a working period matched with the current performance indicator of the node on which it is determined that a change occurs; and the transmitter 72 may be further configured to send, to the node on which it is determined that a change occurs, an updated beacon frame that includes the information about the working period.

In this implementation manner, it can be implemented that, a current performance indicator sent by each node is received after a working period is configured for each node in the foregoing network. When it is determined that performance indicators of some nodes change, working periods matched with current performance indicators are configured again for these nodes, so as to implement timely update of the working periods of the nodes and maximize utilization of network resources.

Optionally, in this implementation manner, for the updated beacon frame, refer to the beacon frame in the foregoing implementation manners. That is, the updated beacon frame includes a super-frame specification field and a beacon payload field. The foregoing updated quantity of nodes is a quantity of the node on which it is determined that a change occurs, and each period allocation descriptor in the period allocation list corresponds to one node on which it is determined that a change occurs.

In an optional implementation manner, the processor 71 is further configured to perform the following step after the step of sending, to each node, an updated beacon frame that includes information about the working period:

when a current beacon frame needs to be broadcast, obtaining, by calculation according to a working period allocated to each node in the network, at least one node that can receive the current beacon frame, and using the at least one node as a group;

configuring, according to a GTS request sent in a previous super frame that is established, on each node, by the node in the group, a GTS field included in the current beacon frame, where the GTS field is used to identify a node that is assigned to the group in a contention free period of a super frame corresponding to the current beacon frame, and the previous super frame established by the node is a previous super frame of the super frame that corresponds to the current beacon frame and is established by the node; and sending the current beacon frame to the node in the group.

It should be noted that in the present invention, a beacon frame (such as an updated beacon frame, a working beacon frame, and a current beacon frame) may be sent to all nodes in the network. However, working periods of different nodes are different; therefore, different beacon frames are received by different nodes. For example, the foregoing current beacon frame is received by the node in the foregoing group.

Optionally, in this implementation manner, the current beacon frame may be any beacon frame after the foregoing updated beacon frame.

In an optional implementation manner, the network device may further include:

a memory 74, configured to store a program that is executed by the processor 71.

In the foregoing technical solution, on a basis of the foregoing embodiments, a corresponding working period is configured for each node in a network; in this way, it can be implemented that an updated beacon frame is sent to implement an adjustment of the working period of each node, and network resources in a personal area network can also be properly utilized.

Figure 17:
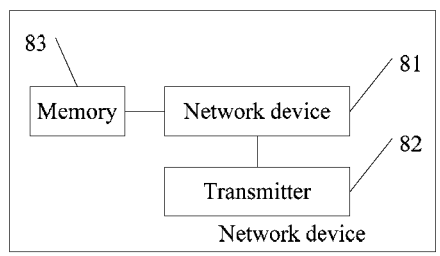
FIG. 17 is a schematic structural diagram of another network device according to an embodiment of the present invention.

FIG. 17 is a schematic structural diagram of another network device according to an embodiment of the present invention. As shown in FIG. 17, the network device includes a processor 81 and a transmitter 82, where the processor 81 is configured to configure, for a newly added node, a working period matched with a performance indicator of the newly added node, where duration of the working period is an integer multiple of duration of a super frame, and the super frame is a super frame corresponding to a beacon frame in a network in which the node is located; and the transmitter 82 is configured to send, to the newly added node, an updated beacon frame that includes information about the working period, so that the newly added node acquires the information about the working period from the updated beacon frame, receives a working beacon frame, establishes a super frame corresponding to the working beacon frame until the working period ends, and then repeats the receiving a working beacon frame and establishing a super frame corresponding to the working beacon frame until the updated beacon frame is received again, where the working beacon frame is a beacon frame broadcast in the network at a start moment of the working period.

Optionally, the foregoing newly added node may be a newly added node in the foregoing network.

Optionally, duration of super frames corresponding to all beacon frames in the foregoing network may be the same, that is, duration of super frames established by nodes is the same.

Optionally, the foregoing network may be a personal area network.

In an optional implementation manner, the updated beacon frame may include:

a super-frame specification field and a beacon payload field; where the $13^{th}$ bit of the super-frame specification field is set to 1, the beacon payload field includes a period allocation field, the period allocation field includes an updated quantity of nodes, a beacon order, and a period allocation list, the beacon order is used to indicate duration of a super frame corresponding to the updated beacon frame, the period allocation list includes at least one period allocation descriptor, and the period allocation descriptor includes an address of a node and information that corresponds to the address of the node and is about times of the duration of the super frame;

the updated quantity of nodes is a quantity of the newly added node; and the period allocation list includes a period allocation descriptor, where a quantity of the period allocation descriptor is the quantity of the newly added node, one period allocation descriptor corresponds to one newly added node, and the duration of the working period of the newly added node is equal to the duration of the super frame multiplied by the times, where the times are included in the period allocation descriptor.

Optionally, the foregoing newly added node may include a plurality of nodes or one node.

Optionally, when acquiring the foregoing super-frame specification field, and discovering that the $13^{th}$ bit of the foregoing super-frame specification field is 1, the foregoing newly added node acquires the beacon payload field in the beacon frame, acquires the period allocation field, and acquires the period allocation descriptor that includes the address of the newly added node, so as to obtain the information about the times of the duration of the super frame. In this way, the duration of the working period of the newly added node can be obtained, thereby timing the working period and receiving a beacon frame that is sent at a start moment of the working period.

In an optional implementation manner, the network device may further include:

a memory 83, configured to store a program that is executed by the processor 81.

In the foregoing technical solution, on a basis of the foregoing embodiments, configuration of a working period for a newly added node is described with emphasis, so as to implement that the working period matched with a performance indicator of the newly added node is applicable to working of the newly added node, and implement proper utilization of network resources in a personal area network.

Figure 18:
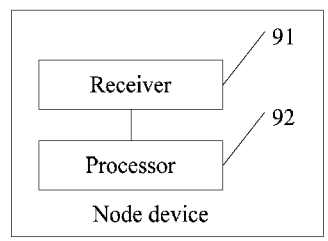
FIG. 18 is a schematic structural diagram of another node device according to an embodiment of the present invention.

FIG. 18 is a schematic structural diagram of another node device according to an embodiment of the present invention. As shown in FIG. 18, the node device includes a receiver 91 and a processor 92, where the receiver 91 is configured to receive an updated beacon frame that includes information about a working period and is sent by a coordinator, where the working period is matched with a performance indicator of a device that implements a method, duration of the working period is an integer multiple of duration of a super frame, and the super frame is a super frame corresponding to a beacon frame in a network in which the device is located; and the processor 92 is configured to perform the following step:

acquiring the information about the working period from the updated beacon frame;

receiving a working beacon frame, where the working beacon frame is a beacon frame sent by the coordinator at a start moment of the working period; and establishing a super frame corresponding to the working beacon frame, and when the working period ends, repeating the step of receiving a working beacon frame until the updated beacon frame is received again.

Optionally, the node device may be a node device in a network, such as an electricity meter, a water meter, or a gas meter in a personal area network, the node device may further be a wireless sensing node device in a wireless monitoring system based on a wireless sensor network, and the node device may further be a wireless sensing node device in a wireless smart household system based on a wireless sensor network.

Optionally, duration of super frames corresponding to all beacon frames in the foregoing network may be the same, that is, duration of super frames established by nodes is the same.

In an optional implementation manner, the foregoing performance indicator may include at least one of the following:

residual energy of node energy, a data receiving and sending throughput, a data reporting frequency, and an alarm delay.

Optionally, lower residual energy of node energy indicates longer duration of the working period of the receiver 91; on the contrary, higher residual energy of node energy indicates shorter duration of the working period of the receiver 91.

Optionally, a lower data receiving and sending throughput of the node device indicates longer duration of the working period of the receiver 91; on the contrary, a higher data receiving and sending throughput of the node device indicates shorter duration of the working period of the receiver 91.

Optionally, a lower data reporting frequency of the node device indicates longer duration of the working period of the receiver 91; on the contrary, a higher data reporting frequency of the node device indicates shorter duration of the working period of the receiver 91.

Optionally, a longer alarm delay of the node device indicates longer duration of the configured working period of the receiver 91; on the contrary, a shorter alarm delay of the node device indicates shorter duration of the configured working period of the receiver 91.

Optionally, the working beacon frame is the beacon frame sent by the coordinator at the start moment of the working period, that is, time at which the foregoing coordinator sends the working beacon frame is the same as the foregoing start time of timing of the working period. In this case, when the working period ends, the processor 92 repeats the receiving a working beacon frame; in this way, only one working beacon frame is received within each working period, that is, one beacon frame is received within one working period, and the beacon frame sent by the foregoing coordinator at the start moment of timing of the working period is received.

In the foregoing technical solution, an updated beacon frame that includes information about a working period and is sent by a coordinator is received, a working beacon frame is received, where the working beacon frame is a beacon frame sent by the coordinator at a start moment of the working period; a super frame corresponding to the working beacon frame is established, and when the working period ends, the step of receiving a working beacon frame is repeated until the updated beacon frame is received again. The foregoing working period is configured by the coordinator based on a performance indicator, that is, the working period is matched with the performance indicator; therefore, network resources can be properly utilized.

Figure 19:
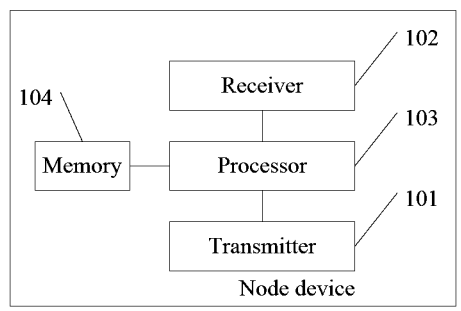
FIG. 19 is a schematic structural diagram of another node device according to an embodiment of the present invention.

FIG. 19 is a schematic structural diagram of another node device according to an embodiment of the present invention. As shown in FIG. 19, the node device includes a transmitter 101, a receiver 102, and a processor 103, where the transmitter 101 is configured to send a current performance indicator to a coordinator, so that the coordinator determines whether a change occurs between the current performance indicator and a performance indicator that is acquired by the coordinator in advance and is of a device that implements a method, and if a change occurs between the current performance indicator and a performance indicator that is acquired by the coordinator in advance and is of a device that implements a method, the coordinator configures, for the device that implements the method, a working period matched with the current performance indicator, where duration of the working period is an integer multiple of duration of a super frame, and the super frame is a super frame corresponding to a beacon frame in a network in which the device is located;

the receiver 102 is configured to receive an updated beacon frame that includes information about the working period and is sent by the coordinator; and the processor 103 is configured to perform the following step:

acquiring the information about the working period from the updated beacon frame;

receiving a working beacon frame, where the working beacon frame is a beacon frame sent by the coordinator at a start moment of the working period; and establishing a super frame corresponding to the working beacon frame, and when the working period ends, repeating the step of receiving a working beacon frame until the updated beacon frame is received again.

In an optional implementation manner, after the information about the foregoing working period is acquired, time at which the coordinator sends the working beacon frame, that is, the start moment of the working period can be learned according to the information about the working period.

Optionally, the step, which is performed by the processor 103, of receiving a working beacon frame may include:

timing the working period, and receiving the working beacon frame.

Optionally, the transmitter 101 may work periodically, for example, once a day. In this way, the coordinator can learn in time a performance indicator that is of each device and is managed by the coordinator, and configure an updated working period for each device.

Optionally, the receiver 102 may be further configured to receive the updated beacon frame that includes the information about the working period and is sent by the coordinator, where the working period is matched with the current performance indicator.

In this implementation manner, instant update of a working period can be implemented.

In an optional implementation manner, the updated beacon frame may include:

a super-frame specification field and a beacon payload field; where the 13$^{th}$ bit of the super-frame specification field is set to 1, the beacon payload field includes a period allocation field, the period allocation field includes an updated quantity of devices, a beacon order, and a period allocation list, the beacon order is used to indicate duration of a super frame corresponding to the updated beacon frame, the period allocation list includes at least one period allocation descriptor, and the period allocation descriptor includes an address of a device and information about times of the duration of the super frame; and one period allocation descriptor corresponds to one device, and duration that corresponds to each device and is of a working period is equal to the duration of the super frame multiplied by the times, where the times are included in the period allocation descriptor corresponding to the device.

The foregoing updated quantity of nodes is a quantity of all devices that are in the network and of which working periods need to be updated.

Optionally, in this implementation manner, the step, which is performed by the processor 103, of acquiring the information about the working period from the updated beacon frame may include:

acquiring the beacon order from the updated beacon frame, and obtaining, by calculation, the duration of the super frame corresponding to the updated beacon frame; and acquiring, from the period allocation list, an allocation descriptor that includes the address of the device that implements the method, acquiring the information about the times of the duration of the super frame from the acquired allocation descriptor, and using the duration of the super frame multiplied by the times as the duration of the working period.

In an optional implementation manner, before the processor 103 performs the step of receiving a working beacon frame, the processor 103 may be further configured to perform the following step:

establishing a super frame corresponding to the updated beacon frame; and the step, which is performed by the processor 103, of receiving a working beacon frame may include:

after the super frame ends, receiving the working beacon frame at the start moment of the working period.

Feasibly, the step, which is performed by the processor 103, of receiving a working beacon frame may include:

when the super frame ends, timing the working period, and receiving the working beacon frame at the start moment of the working period.

In an optional implementation manner, the node device may further include:

a memory 104, configured to store a program that is executed by the processor 103.

In the foregoing technical solution, on a basis of the foregoing embodiments, a step of sending a current performance indicator to a coordinator is added. In this way, the coordinator can configure in time a working period matched with the current performance indicator; and therefore, network resources can be properly utilized.

Figure 20:
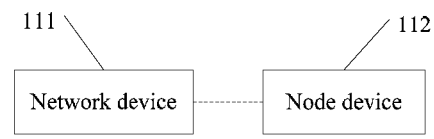
FIG. 20 is a schematic structural diagram of another node scheduling system according to an embodiment of the present invention.

FIG. 20 is a schematic structural diagram of a node scheduling system according to an embodiment of the present invention. As shown in FIG. 20, the system includes a network device 111 and a node device 112.

In an optional implementation manner, the network device 111 may be a network device according to any one of implementation manners in FIG. 15 to FIG. 17.

In an optional implementation manner, the node device 112 may be a node device according to any one of implementation manners in FIG. 18 to FIG. 19.

In the foregoing technical solution, a network device configures, for a node, a working period matched with a performance indicator of the node, and the network device sends, to the node, an updated beacon frame that includes information about the working period; a node device acquires the information about the working period from the updated beacon frame, receives a working beacon frame, establishes a super frame corresponding to the working beacon frame until the working period ends, and then repeats the receiving a working beacon frame and establishing a super frame corresponding to the working beacon frame until the updated beacon frame is received again. A working period matched with a performance indicator of a node is configured for the node, the node device receives a working beacon frame in the working period, and the working beacon frame is a beacon frame sent by a coordinator at a start moment of the working period; in this way, it can be implemented that only one beacon frame is received within one working period. Compared with the prior art in which all node devices receive all beacon frames, the present invention can make network resources in a personal area network be properly utilized.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The foregoing storage medium may be a magnetic disk, an optical disc, a read-only memory (Read-Only Memory, ROM), or a random access memory (Random Access Memory, RAM for short).

The foregoing description merely discloses exemplary embodiments of the present invention and definitely cannot be used to limit the scope of the claims of the present invention. Therefore, equivalent variations made according to the claims of the present invention still fall within the scope of the present invention.

What is claimed is:

1. A node scheduling method comprising:

configuring, for each node in a network, a working period matched with a performance indicator of the node, wherein a duration of the working period of each node is an integer multiple of duration of a super frame corresponding to a beacon frame in the network; and sending, to each of the nodes, an updated beacon frame that comprises information about the working period, so that each node a) acquires the information about the working period from the updated beacon frame, b) receives a working beacon frame that is a beacon frame broadcast in the network at a start moment of the working period, c) establishes a super frame corresponding to the working beacon frame until the working period ends, and d) then repeats receiving the working beacon frame and establishing the super frame corresponding to the working beacon frame until the updated beacon frame is received again, obtaining, according to the working period of each node in the network, at least one node that can receive the beacon frame for broadcasting, configuring on each node a guaranteed timeslot (GTS) field in the beacon frame according to a GTS request in a previous super frame, wherein the GTS field identifies a node in the network in a contention free period of the super frame corresponding to the beacon frame; and sending the working beacon frame to the obtained node in the network.

2. The method according to claim 1, wherein the performance indicator further comprises at least one of the following:

residual energy of node energy, a data receiving and sending throughput, and a data reporting frequency.

3. The method according to claim 1, wherein the updated beacon frame comprises:

a super-frame specification field and a beacon payload field, wherein
  (a) the $13^{th}$ bit of the super-frame specification field is set to 1,
  (b) the beacon payload field comprises a period allocation field,
  (c) the period allocation field comprises an updated quantity of nodes, a beacon order, and a period allocation list,
  (d) the beacon order is used to indicate duration of a super frame corresponding to the updated beacon frame,
  (e) the period allocation list comprises at least one period allocation descriptor, and
  (f) the period allocation descriptor comprises an address of a node and information about times of the duration of the super frame;

the updated quantity of nodes is a quantity of all nodes in the network; and the period allocation list comprises a period allocation descriptor, wherein a quantity of the period allocation descriptor is the quantity of all nodes in the network, one period allocation descriptor corresponds to one node, and duration of the working period of each node is equal to the duration of the super frame multiplied by the times, wherein the times are comprised in the period allocation descriptor corresponding to the node.

4. The method according to claim 1, wherein configuring, for each node, the working period matched with the performance indicator of the node comprises:

configuring, for a newly added node, a working period matched with a performance indicator of the newly added node; and wherein sending, to the node, the updated beacon frame that comprises information about the working period comprises:

sending, to the newly added node, an updated beacon frame that comprises information about the working period, so that the newly added node acquires the information about the working period from the updated beacon frame, receives a working beacon frame, establishes a super frame corresponding to the working beacon frame until the working period ends, and then repeats the receiving a working beacon frame and establishing a super frame corresponding to the working beacon frame until the updated beacon frame is received again, wherein the working beacon frame is a beacon frame broadcast in the network at a start moment of the working period.

5. The method according to claim 4, wherein the updated beacon frame comprises:

a super-frame specification field and a beacon payload field, wherein
  (a) the $13^{th}$ bit of the super-frame specification field is set to 1,
  (b) the beacon payload field comprises a period allocation field,
  (c) the period allocation field comprises an updated quantity of nodes, a beacon order, and a period allocation list,
  (d) the beacon order is used to indicate duration of a super frame corresponding to the updated beacon frame,
  (e) the period allocation list comprises at least one period allocation descriptor, and
  (f) the period allocation descriptor comprises an address of a node and information that corresponds to the address of the node and is about times of the duration of the super frame;

the updated quantity of nodes is a quantity of the newly added node; and the period allocation list comprises a period allocation descriptor, wherein a quantity of the period allocation descriptor is the quantity of the newly added node, one period allocation descriptor corresponds to one newly added node, and duration of the working period of the newly added node is equal to the duration of the super frame multiplied by the times, wherein the times are comprised in the period allocation descriptor.

6. The method according to claim 1, wherein before configuring, for each node, the working period matched with the performance indicator of the node, the method further comprises:

receiving a current performance indicator reported by each node in the network, separately determining whether a change occurs between the received current performance indicator of each node and a performance indicator that is acquired in advance and is of the node, and if a change occurs between the received current performance indicator of each node and the performance indicator that is acquired in advance and is of the node, triggering the step of configuring, for a node, a working period matched with a performance indicator of the node;

wherein configuring, for a node, the working period matched with the performance indicator of the node comprises configuring, for a node on which it is determined that a change occurs, a working period matched with the current performance indicator of the node on which it is determined that a change occurs; and wherein sending, to the node, the updated beacon frame comprising information about the working period comprises sending, to the node on which it is determined that a change occurs, an updated beacon frame that comprises information about the working period.

7. A network device for scheduling nodes in a network, the network device comprising:

a processor configured to provide for each node in the network,
  a) a working period matched with a performance indicator of the node, wherein a duration of the working period is an integer multiple of a duration of a super frame corresponding to a working beacon frame for broadcasting in the network at a start moment of the working period;

b) at least one node, according to the working period for the node, that can receive the working beacon frame; and
c) a guaranteed timeslot (GTS) field in the working beacon frame according to a GTS request in a previous super frame, wherein the GTS field identifies a node in the network in a contention free period of the super frame corresponding to the working beacon frame;
d) an updated beacon frame for broadcasting to nodes in the network that comprises information about the working period, allowing each node to:
  i. acquire the information about the working period from the updated beacon frame,
  ii. receive a working beacon frame that is a beacon frame broadcast in the network at a start moment of the working period,
  iii. establish a super frame corresponding to the working beacon frame until the working period ends, and
  iv. repeatedly receive the working beacon frame and establishing the super frame corresponding to the working beacon frame until the updated beacon frame is received again; and
a transmitter configured to broadcast the working and updated beacon frames.

8. The network device according to claim 7, wherein the processor is further configured to provide, for each node in the network, a working period matched with a performance indicator of the node; and
the transmitter is further configured to transmit, to each node, an updated beacon frame that comprises information about the working period, so that each node is able to acquire, from the updated beacon frame, the information about the working period of the node, and enable the node to receive a working beacon frame, establish a super frame corresponding to the working beacon frame until the working period ends, and then repeatedly receive a working beacon frame and establish a super frame corresponding to the working beacon frame until the updated beacon frame is received again.

9. The network device according to claim 8, wherein the updated beacon frame comprises:
a super-frame specification field and a beacon payload field, wherein
  (a) the $13^{th}$ bit of the super-frame specification field is set to 1,
  (b) the beacon payload field comprises a period allocation field,
  (c) the period allocation field comprises an updated quantity of nodes, a beacon order, and a period allocation list,
  (d) the beacon order is used to indicate duration of a super frame corresponding to the updated beacon frame,
  (e) the period allocation list comprises at least one period allocation descriptor, and
  (f) the period allocation descriptor comprises an address of a node and information about times of the duration of the super frame;
the updated quantity of nodes is a quantity of all nodes in the network; and
the period allocation list comprises a period allocation descriptor, wherein a quantity of the period allocation descriptor is the quantity of all nodes in the network, one period allocation descriptor corresponds to one node, and duration of the working period of each node is equal to the duration of the super frame multiplied by the times, wherein the times are comprised in the period allocation descriptor corresponding to the node.

10. The network device according to claim 7, wherein the processor is further configured to provide, for a newly added node, a working period matched with a performance indicator of the newly added node; and
the transmitter is further configured to transmit, to the newly added node, an updated beacon frame that comprises information about the working period, so that the newly added node is able to (1) acquire the information about the working period from the updated beacon frame, (2) receive a working beacon frame, (3) establish a super frame corresponding to the working beacon frame until the working period ends, and (4) then repeatedly receive a working beacon frame and establish a super frame corresponding to the working beacon frame until the updated beacon frame is received again.

11. The network device according to claim 10, wherein the updated beacon frame comprises:
a super-frame specification field and a beacon payload field, wherein
  (a) the $13^{th}$ bit of the super-frame specification field is set to 1,
  (b) the beacon payload field comprises a period allocation field,
  (c) the period allocation field comprises an updated quantity of nodes, a beacon order, and a period allocation list,
  (d) the beacon order is used to indicate duration of a super frame corresponding to the updated beacon frame,
  (e) the period allocation list comprises at least one period allocation descriptor, and
  (f) the period allocation descriptor comprises an address of a node and information that corresponds to the address of the node and is about times of the duration of the super frame;
the updated quantity of nodes is a quantity of the newly added node; and
the period allocation list comprises a period allocation descriptor, wherein a quantity of the period allocation descriptor is the quantity of the newly added node, one period allocation descriptor corresponds to one newly added node, and duration of the working period of the newly added node is equal to the duration of the super frame multiplied by the times, wherein the times are comprised in the period allocation descriptor.

12. The network device according to claim 7, wherein the processor is further configured to:
receive a current performance indicator reported by each node in the network, and separately determine whether a change occurs between the received current performance indicator of each node and a performance indicator that is acquired in advance and is of the node; and
when a result of determining by the processor is yes, configure, for a node on which it is determined that a change occurs, a working period matched with the current performance indicator of the node on which it is determined that a change occurs; and
the transmitter is further configured to transmit to the node on which it is determined that a change occurs an updated beacon frame that comprises information about the working period.

13. A node device in a network, the node device comprising:

a receiver configured to receive from a coordinator (a) a working beacon frame sent by the coordinator at a start moment of a working period (b) an updated beacon frame that comprises information about the working period, wherein the working period is matched with a performance indicator of the node device, a duration of the working period is an integer multiple of a duration of a super frame corresponding to a beacon frame in the network and (c) when the working period ends, repeat receiving the working beacon frame until the updated beacon frame is received again;

a processor configured to acquire the information about the working period from the updated beacon frame and establish a super frame corresponding to the working beacon frame;

wherein the information comprises:
(a) an updated quantity of node devices in the network,
(b) a beacon order indicating a duration of a super frame corresponding to the updated beacon frame, and
(c) a period allocation list comprising, for each node device in the network, an address of a node device and the duration of the super frame for the node.

14. The node device according to claim 13, wherein the processor is configured to establish the super frame corresponding to the updated beacon frame; and the receiver is further configured to, after the super frame ends, receive the working beacon frame at the start moment of the working period.

15. The node device according to claim 13, wherein the updated beacon frame comprises:

a super-frame specification field and a beacon payload field, wherein (a) a $13^{th}$ bit of the super-frame specification field is set to 1, and (b) the beacon payload field comprises a period allocation field comprising the updated quantity of node devices, the beacon order, and the period allocation list; and the period allocation list comprises at least one period allocation descriptor corresponding to one node device, and a duration that corresponds to each node device and is of a working period equal to the duration of the super frame multiplied by the times in the period allocation descriptor corresponding to the node device.

16. The node device according to claim 15, wherein the processor is further configured to:

acquire the beacon order from the updated beacon frame;
obtain the duration of the super frame corresponding to the updated beacon frame;
acquire, from the period allocation list, an allocation descriptor that comprises the address of the node device;
acquire the information about the times of the duration of the super frame from the acquired allocation descriptor; and
use the duration of the super frame multiplied by the times as the duration of the working period.

17. The node device according to claim 13, wherein the node device further comprises:

a transmitter configured to transmit a current performance indicator to the coordinator, so as to enable the coordinator to determine whether a change occurs between the current performance indicator and the performance indicator acquired by the coordinator in advance of the node device, and if a change occurs between the current performance indicator and the performance indicator acquired by the coordinator in advance of the node device, the coordinator is enabled to configure, for the node device, a working period matched with the current performance indicator; and the receiver is further configured to receive the updated beacon frame that comprises the information about the working period sent by the coordinator, wherein the working period is matched with the current performance indicator.

* * * * *